United States Patent
Ancin et al.

(10) Patent No.: US 11,663,355 B2
(45) Date of Patent: *May 30, 2023

(54) SYSTEMS AND METHODS FOR FACILITATING ACCESS TO PRIVATE FILES USING A CLOUD STORAGE SYSTEM

(71) Applicant: Egnyte, Inc., Mountain View, CA (US)

(72) Inventors: Hakan Ancin, Los Gatos, CA (US); Xi Chen, Davis, CA (US); Amrit Jassal, Morgan Hill, CA (US); Daniel H. Jung, San Ramon, CA (US); Gregory B. Neustaetter, Sunnyvale, CA (US); Sean H. Puttergill, Sunnyvale, CA (US); Ramakrishnan Sundararaj, Sunnyvale, CA (US); Sanjay Vedanthan, Santa Clara, CA (US); Chandra Yalangi, San Jose, CA (US); Ramanathan Kavasseri, Fremont, CA (US); Ravi Wijayaratne, San Jose, CA (US); Shishir Sharma, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/684,184

(22) Filed: Mar. 1, 2022

(65) Prior Publication Data

US 2022/0382899 A1     Dec. 1, 2022

Related U.S. Application Data

(63) Continuation of application No. 16/899,516, filed on Jun. 11, 2020, now Pat. No. 11,275,863, which is a
(Continued)

(51) Int. Cl.
G06F 21/62     (2013.01)
G06F 15/173    (2006.01)
(Continued)

(52) U.S. Cl.
CPC .... *G06F 21/6227* (2013.01); *G06F 15/17331* (2013.01); *G06F 16/122* (2019.01);
(Continued)

(58) Field of Classification Search
CPC .......... G06F 21/6227; G06F 15/17331; G06F 16/122; G06F 16/14; G06F 16/178;
(Continued)

(56) References Cited

U.S. PATENT DOCUMENTS 5,692,180 A * 11/1997 Lee .................... G06F 16/27
8,220,061 B2 * 7/2012 Fujita ................ G06F 21/6272
                                                        726/25
(Continued)

*Primary Examiner* — Alina A Boutah
(74) *Attorney, Agent, or Firm* — Larry E. Henneman, Jr.; Henneman & Associates, PLC

(57) ABSTRACT

A method for providing access to objects associated with a particular client in a cloud storage system is disclosed. The method includes the steps of establishing a connection with a user, providing a client namespace associated with the client to the user, where the client namespace represents objects stored on the cloud storage system and objects stored on a private storage system apart from the cloud storage system, receiving a request from the user to access an object stored on the private storage system, and providing information to the user to facilitate access to the object stored on the private storage system by said user. Other systems and methods are also disclosed. Important advantages of the present invention are facilitated by separating the logic for user access (control plane) from the actual storage (Storage plane). Private file system access can still be managed from the cloud, while keeping the client data private.

19 Claims, 29 Drawing Sheets

Related U.S. Application Data continuation of application No. 15/967,160, filed on Apr. 30, 2018, now Pat. No. 10,762,230, which is a continuation of application No. 15/010,415, filed on Jan. 29, 2016, now Pat. No. 10,037,434, which is a continuation of application No. 14/053,357, filed on Oct. 14, 2013, now Pat. No. 9,251,114.

(60) Provisional application No. 61/868,268, filed on Aug. 21, 2013, provisional application No. 61/713,445, filed on Oct. 12, 2012.

(51) Int. Cl.
| | | |
|---|---|---|
| *G06F 16/11* | (2019.01) | |
| *G06F 16/14* | (2019.01) | |
| *G06F 16/178* | (2019.01) | |
| *G06F 16/182* | (2019.01) | |
| *G06F 16/27* | (2019.01) | |
| *H04L 9/40* | (2022.01) | |

(52) U.S. Cl.
CPC ............ *G06F 16/14* (2019.01); *G06F 16/178* (2019.01); *G06F 16/1844* (2019.01); *G06F 16/27* (2019.01); *G06F 21/62* (2013.01); *G06F 21/6209* (2013.01); *H04L 63/08* (2013.01); *H04L 63/10* (2013.01); *H04L 63/105* (2013.01); *H04L 63/20* (2013.01)

(58) Field of Classification Search
CPC ...... G06F 16/1844; G06F 16/27; G06F 21/62; G06F 21/6209; H04L 63/08; H04L 63/10; H04L 63/105; H04L 63/20
See application file for complete search history.

(56) References Cited

U.S. PATENT DOCUMENTS

| | | | |
|---|---|---|---|
| 8,656,454 B2 * | 2/2014 | Gunawardena | G06F 16/1752 726/1 |
| 9,043,567 B1 * | 5/2015 | Modukuri | G06F 3/0665 711/162 |
| 9,852,149 B1 * | 12/2017 | Taylor | G06F 16/1844 |
| 2005/0125503 A1 * | 6/2005 | Iyengar | H04L 67/565 709/213 |
| 2010/0325422 A1 * | 12/2010 | Gnanasambandam | G06F 16/122 713/153 |
| 2012/0101995 A1 * | 4/2012 | Agetsuma | G06F 3/0605 707/E17.044 |
| 2012/0271949 A1 * | 10/2012 | Radhakrishnan | H04L 67/61 709/226 |
| 2012/0278622 A1 * | 11/2012 | Lesavich | G06F 16/958 713/168 |
| 2012/0297188 A1 * | 11/2012 | van der Linden | H04L 9/0825 713/165 |
| 2012/0324589 A1 * | 12/2012 | Nukala | H04L 63/10 726/28 |
| 2012/0330894 A1 * | 12/2012 | Slik | G06F 16/196 707/626 |
| 2013/0138504 A1 * | 5/2013 | Bookstaff | H04M 15/8083 705/14.49 |
| 2013/0185258 A1 * | 7/2013 | Bestler | G06F 16/1844 707/638 |
| 2014/0006350 A1 * | 1/2014 | Fukui | G06F 16/178 707/632 |
| 2014/0019558 A1 * | 1/2014 | Pollack | H04L 51/08 709/206 |
| 2014/0149794 A1 * | 5/2014 | Shetty | G06F 16/951 709/213 |
| 2014/0279893 A1 * | 9/2014 | Branton | G06F 16/904 707/634 |
| 2014/0373092 A1 * | 12/2014 | Hussain | G06F 9/5072 726/3 |
| 2015/0154211 A1 * | 6/2015 | Matsubara | H04L 67/01 707/812 |
| 2015/0326579 A1 * | 11/2015 | Chandwani | H04L 63/0281 709/225 |
| 2017/0124111 A1 * | 5/2017 | Sharma | G06F 16/178 |
| 2018/0083830 A1 * | 3/2018 | Pendleton | H04L 41/5096 |

* cited by examiner

SYSTEMS AND METHODS FOR FACILITATING ACCESS TO PRIVATE FILES USING A CLOUD STORAGE SYSTEM

CROSS-REFERENCE TO RELATED APPLICATIONS

This application is a continuation of co-pending U.S. patent application Ser. No. 16/899,516, filed on Jun. 11, 2020 by the same inventors, which is a continuation of U.S. patent application Ser. No. 15/967,160, filed on Apr. 30, 2018 by the same inventors, which is a continuation of U.S. patent application Ser. No. 15/010,415, filed on Jan. 29, 2016 by the same inventors, which is a continuation of U.S. patent application Ser. No. 14/053,357, filed on Oct. 14, 2013 by the same inventors, which claims the benefit of U.S. Provisional Patent Application Ser. No. 61/713,445, filed on Oct. 12, 2012 and having at least one common inventor, and also claims the benefit of U.S. Provisional Patent Application Ser. No. 61/868,268, filed on Aug. 21, 2013 and having at least one common inventor. All of the foregoing applications are incorporated herein by reference in their respective entireties.

BACKGROUND OF THE INVENTION

Field of the Invention

This invention relates generally to cloud storage systems, and more particularly to systems and methods for providing clients access to files via a remote cloud storage system. Even more particularly, the invention relates to systems and methods for facilitating data security, providing users access to files stored at a client site using the remote cloud storage system, to provide efficient browsing and file access, and to provide faster synchronization in hybrid cloud storage solutions.

Description of the Background Art

Cloud Storage has rapidly become a credible part of a company's information technology (IT) infrastructure. Most organizations are evaluating cloud storage in some manner and plan to make it an essential part of the landscape.

The drivers for cloud storage adoption vary depending on the use case. Easy accessibility to data anywhere on any device, particularly phones and tablets, and ease of file sharing rank high for end-users. For IT, the ability to deliver these new capabilities without an increase in capital expenditures (CAPEX) and management overhead justifies the promise of the cloud. Additionally, the cloud presents an opportunity to revisit traditional infrastructure investments (such as on-premise storage, virtual private networking (VPN), etc.) and offload these services to the cloud.

While cloud storage offers tremendous benefits for both users and IT, it is still in the early stages of adoption. Though cloud storage growth is poised to be strong over the next few years, there are several factors that stand in the way of uptake and full acceptance.

Security is one of the major hurdles in moving to the cloud. While each company and industry vertical has different needs, certain data sets and use cases preclude data being stored in the cloud. In such cases organizations prefer to keep data on premises in order to meet specific security and compliance needs.

Businesses have to satisfy many use cases where pure cloud based storage is not practical for access. For example, if users need to work with large files such as CAD drawings, videos or images that are hundreds of megabytes (MBs), pure cloud access through the internet is impractical. The latency associated with opening and editing such large files from a cloud-based server is prohibitive. This is where traditional on-premise storage continues to play an important role because files can be accessed at LAN speeds.

In addition, businesses have invested in a range of on-premise storage over the last few decades. Petabytes (PBs) of data resides on-premise. Leveraging the cloud requires moving (i.e. migrating) data from on-premise servers to the cloud. This process can be cumbersome at best. Recent surveys indicate that less than 10% of enterprise data is currently in the cloud. Over 90% still resides on-premise and business users demand "cloud-like ability" for on-premise data, i.e. secure mobile access and sharing of legacy files that resides on-premise.

While the actual storage and underlying security are of great concern and importance to IT, they are not to end users. End users want timely access and mobility of their files so they can get their jobs done. If IT cannot deliver such a solution, end users will find a way around IT. Such rogue practices place corporate data at great risk.

The vendor landscape for cloud storage has developed to satisfy these varying needs. Solution providers classify themselves along Public and Private cloud dimensions. Public cloud providers host all customer files on their own storage or leverage $3^{rd}$ party storage providers such as Amazon S3 or Google Cloud Storage. They manage all the software and storage on behalf of the customer thereby completely alleviating any management overhead on the part of IT. IT can rent these capabilities on a subscription basis. Public cloud solutions have led the rise of cloud storage in the enterprise. However, as discussed earlier a pure public cloud model is not viable for use cases where performance is a consideration and for scenarios where data cannot be placed in the public cloud.

Private cloud solutions provide IT with software that can be run and hosted within the customer data center, allowing the customer to store data on-premises and deliver public cloud like capabilities to users. While these solutions allow data to be stored on customer premises, they impose on IT the need to host, manage, and upgrade the software, which significantly diminishes the value provided by a private cloud model. Private cloud solutions represent a return to the traditional world of installed on-premises software.

Current vendor offerings force IT to choose different solutions for different use cases, thereby increasing complexity and costs. IT has to characterize files and use cases along Red and Green categories, where Green file sets can be hosted in the public cloud but Red files need to strictly stay on-premises. IT then has the option to implement a Private Cloud solution for Red files and use cases, while opting for public cloud in the case of Green files and use cases.

This approach is far from ideal. File access is fragmented for end users, with different access points and applications from different vendors for Green vs. Red files. IT still has to host and manage software increasing CAPEX and operational expenditures (OPEX). Additionally, this creates data silos across different storage platforms and adds complexity to the landscape. Some organizational data sits on-premise, other data in the public cloud without any bridge between the two.

The current vendor landscape and solution architectures leave a lot to be desired. Organizations are forced to choose between convenience and security.

What is needed, therefore, are systems and methods for providing "cloud-like ability" for on-premise, private data.

SUMMARY

The present invention overcomes the problems associated with the prior art by facilitating access to private, on-premise files maintained on one or more private client storage system(s) via the cloud storage system. The invention facilitates accessing files on the private client storage system using the cloud storage system, but without having to place the files on the cloud storage system.

In a cloud storage system, a method is disclosed for providing access to objects associated with a particular client. The method includes the steps of establishing a connection with a user associated with the client over a network, providing a client namespace to the user, where the client namespace represents objects stored on the cloud storage system and objects stored on a private storage system apart from the cloud storage system, receiving a request from the user to access an object stored on the private storage system, and providing information to the user to facilitate access to the object stored on the private storage system by the user. The information can include connection information that enables the user to establish a separate connection with the private storage system. The connection information can include HTTPS endpoints information, where some endpoints can be read-only or read-write. The method can also include redirecting the user to the private storage system.

The step of providing the client namespace to the user can include providing a first portion of the client namespace to the user based on objects stored on the cloud storage system and providing information (e.g., connection information, HTTPS endpoint(s), etc.) to the user to enable the user to retrieve a second portion of the client namespace from the private storage system. Such information can also provide at least a portion of the information to facilitate user access to the object on the private storage system. Alternatively, the step of providing the client namespace to the user includes generating the entirety of the client namespace from information stored on the cloud storage system.

In another method, the step of providing the client namespace can include providing a client namespace further representing objects stored on a second private storage system apart from the cloud storage system. More particularly, the method can include the steps of receiving a request from the user to access an object stored on the second private storage system and providing information to the user to facilitate access to the object stored on the second private storage system by the user. Furthermore, the step of providing the client namespace to the user can include providing a first portion of the client namespace to the user based on objects stored on the cloud storage system, providing information to the user to enable the user to retrieve a second portion of the client namespace from the private storage system, and providing information to the user to enable the user to retrieve a third portion of the client namespace from the second private storage system. The step of establishing the connection with the user can include establishing the connection with the user via the private storage system.

In another particular method, the cloud storage system can function as a communications conduit by establishing a second connection with the private storage system, requesting access to the object on behalf of the user, gaining access to the requested object, and providing access to the requested object to the user.

A cloud storage system for providing access to objects associated with a particular client includes memory for storing data and code, at least one processing unit for executing the code, and at least one network interface. The code includes a namespace module operative to provide a client namespace associated with the client, where the client namespace represents objects stored on the cloud storage system and objects stored on a private storage system apart from the cloud storage system. The namespace module also provides information (e.g., connection information associated with the private storage system, (read-only or read-write) HTTPS endpoint information, etc.) to facilitate access to one of the objects stored on the private storage system. Additionally, the network interface is operative to establish a network connection with a user associated with the client, provide the client namespace to the user, receive a request from the user to access an object stored on the private storage system, and provide the information to facilitate access to the object to the user.

In a particular embodiment, the namespace module provides a first portion of the client namespace based on objects stored on the cloud storage system and provides information (e.g., connection information associated with the private storage system, HTTPS endpoint information, etc.) to enable the user to retrieve a second portion of the client namespace from the private storage system, thereby also providing some of the information to facilitate access to the object on the private storage system by the user. In an alternative embodiment, the namespace module is operative to generate the entirety of the client namespace from information stored on the cloud storage system.

In another particular embodiment, the namespace module is further operative to redirect the user to the private storage system in response to the network interface receiving the request from the user to access the object. The network interface can also establish a second connection with the private storage system, whereby the namespace module can request access to the object on behalf of the user via the second connection, gain access to the requested object via the second connection, and proxy access to the requested object on behalf of the user.

In still another particular embodiment, the namespace module provides a client namespace further representing objects stored on a second private storage system apart from the cloud storage system and provides information to the user to facilitate access to one of the objects stored on the second private storage system. For example, the namespace module can provide a first portion of the client namespace based on objects stored on the cloud storage system, provide information to enable the user to retrieve a second portion of the client namespace from the private storage system, and provide information to enable the user to retrieve a third portion of the client namespace from the second private storage system. The network interface is also operative to establish the connection with the user via the private storage system.

The invention is also directed to a method for providing access to files associated with a particular client. The method includes the steps of identifying a client file system to be accessed remotely where the client file system is stored on at least one client storage system, synchronizing a first portion of the client file system with a cloud storage system located remotely from the client storage system, retaining a second portion of the client file system on the client storage system as a private file system but not on the cloud storage system, and providing access information (e.g., connection information, HTTPS endpoint information, etc.) to the cloud storage system to enable a remote user to directly access the private file system. The private data files can include client metadata and data, and in some cases, the method includes synchronizing the client metadata with the cloud storage system.

A particular method further includes the steps of establishing a connection with a local user, establishing a second connection with the cloud storage system, accessing a client namespace associated with the client via the second connection, where the client namespace represents objects stored on the cloud storage system and objects stored on the at least one client storage system, and requesting access to one of the objects of the client namespace on behalf of the local user. Sometimes the requested object will stored on a second client storage system associated with the client and located remotely from the cloud storage system. In such a case, the method can further include receiving connection information associated with the second client storage system from the cloud storage system, using the connection information to establish a third connection with the second client storage system, and requesting access to the requested object on the second client storage system. An alternate particular method includes obtaining access to the requested object on the second client storage system via the cloud storage system.

For a mobile user associated with the client, a particular method includes the steps of establishing a connection with the mobile user, receiving an access request (e.g., received by an appliance at an HTTPS endpoint) from the mobile user requesting access to the private file system, and providing the requested access via the connection. The method can also include authenticating the mobile user with the client storage system and providing the requested access in accordance with access control policies of the client storage system.

A related client storage system for providing access to a client's files is also disclosed. The client storage system includes a network interface, a storage device for storing data and code, and at least one processing unit operative to execute the code. The data includes a client file system to be accessed remotely, where the client file system includes a first portion synchronized with a cloud storage system located remotely from the client storage system and a second portion retained in the storage but not on the cloud storage system. Furthermore, the code includes a synchronizer operative to synchronize the first portion of the client file system with the cloud storage system and a storage connect appliance operative to provide access information (e.g., connection information, HTTPS endpoint information associated with the appliance) to the cloud storage system to enable a remote user to directly access the private file system. In a particular embodiment, each retained file includes a data file and associated client metadata and the client metadata associated with at least some of the retained files can be stored in the cloud storage system.

According to a particular embodiment, the network interface is further operative to establish a connection with a local user and establish a second connection with the cloud storage system. The storage connect appliance is also further operative to access a client namespace via the second connection, where the client namespace represents objects stored on the cloud storage system and objects stored on the at least one client storage system, and is also operative to request access to one of the objects of the client namespace on behalf of the local user. The requested object can be stored on a second client storage system associated with the client and located remotely from the cloud storage system.

If so, the storage connect appliance can receive connection information associated with the second client storage system from the cloud storage system, use the connection information to establish a third connection with the second client storage system, and request access to the requested object on the second client storage system. Alternatively, the storage connect appliance can be operative to obtain access to the requested object on the second client storage system via the cloud storage system.

In another particular embodiment, the network interface establishes a connection with a mobile user associated with the client and the storage connect appliance receives an access request (e.g., at an HTTPS endpoint) from the mobile user requesting access to the private file system and provides the requested access via the connection. The storage connect appliance can also authenticates the mobile user with the storage device and provide the requested access in accordance with access control policies of the storage device.

Another method for providing access to files via a cloud storage system is also disclosed. The method includes accessing client metadata for each of a plurality of private data files stored on at least one off-site client storage system, combining the client metadata with attributes to generate cloud metadata for the private data files, storing the cloud metadata, but not the plurality of private data files, on the cloud storage system, establishing a connection with a user over a network, and providing a namespace associated with the client to the user based on the cloud metadata, where the namespace includes the private data files and data files stored on the cloud storage system. The attributes can specify one or more off-site client storage systems having the private data files stored thereon. A particular method further includes receiving a request from the user to access a private data file of the namespace, accessing the cloud metadata associated with the requested private data file for connection information (e.g., IP address, HTTPS endpoint (s), etc.) associated with at least one off-site client storage system, and providing the connection information to the user.

The attributes can also include other types of information. For example, the attributes can include connection information associated with the at least one off-site client storage location. The attributes can also include search tags, access control information, replication policies, and/or blobs associated with at least some of the private data files.

Another particular method includes receiving a request from the user to access a private data file stored on multiple ones of the off-site client storage systems, accessing the cloud metadata associated with the requested private data file for connection information associated with target ones of the client storage systems having the requested private data file stored thereon, and providing the connection information for the target ones of the client storage systems to the user. Yet another particular method includes the steps of receiving a request from the user to access a plurality of private data files stored on multiple ones of the off-site client storage systems, accessing the cloud metadata associated with each of the requested private data files for connection information associated with target ones of the client storage systems having the requested private data file stored thereon, and providing the connection information for the target ones of the client storage systems to the user.

Another cloud storage system of the invention includes at least one network interface operative to establish a connection with a user associated with a client over a network, at least one storage device for storing data and code, and at least one processing unit for executing the code. The code includes a namespace module that is operative to access client metadata for each of a plurality of private data files stored on at least one off-site client storage system associated with a client, combine the client metadata with attributes to generate cloud metadata for the private data files, where at least some of the attributes specify one or more off-site client storage systems having the private data files stored thereon, store the cloud metadata but not the plurality of private data files, on the storage device, and provide a namespace associated with the client to the user based on the cloud metadata, where the namespace includes the private data files and data files stored on the cloud storage system. In a particular embodiment, the namespace module can receive a request from the user to access a private data file of the namespace, access the cloud metadata associated with the requested private data file for connection information associated with at least one off-site client storage system, and provide the connection information to the user.

In another particular embodiment, the namespace module can receive a request from the user to access a private data file stored on multiple ones of the off-site client storage systems, access the cloud metadata associated with the requested private data file for connection information associated with target ones of the client storage systems having the requested private data file stored thereon, and provide the connection information for the target ones of the client storage systems to the user. In still another particular embodiment, the namespace module can receive a request from the user to access a plurality of private data files stored on multiple ones of the off-site client storage systems, access the cloud metadata associated with each of the requested private data files for connection information associated with target ones of the client storage systems having the requested private data file stored thereon, and provide the connection information for the target ones of the client storage systems to the user.

The invention also includes a method for replicating files associated with a client including the steps of identifying a client file to be stored on at least one of a client storage system and a cloud storage system, associating a replication policy with the client file to govern whether the associated client file will be stored on each of the client storage system and the cloud storage system, and storing the client file on at least one of the client storage system and the cloud storage system according to the associated replication policy.

The invention describes yet another method for accessing files in a distributed file system associated with a client including the steps of establishing a connection with a cloud storage system, accessing a namespace associated with the client via the cloud storage system, the namespace including a plurality of client files stored on the cloud storage system and a plurality of client storage systems apart from the cloud storage system, requesting access to a client file stored on multiple ones of the client storage systems, receiving connection information associated with target ones of the client storage systems having the requested file stored thereon, establishing connections with each of the target client storage systems, and retrieving different parts of the requested file from different ones of the target client storage systems.

The invention also includes still another method for accessing files in a distributed file system associated with a client including the steps of establishing a connection with a cloud storage system, accessing a namespace associated with the client via the cloud storage system, where the namespace includes a plurality of client files stored on the cloud storage system and a plurality of client storage systems apart from the cloud storage system, requesting access to a plurality of the client files stored on multiple ones of the client storage systems, receiving connection information associated with target ones of the client storage systems having the requested files stored thereon, establishing connections with each of the target client storage systems, and retrieving different ones of the requested files from different ones of the target client storage systems.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a unified client namespace that facilitates accessing files maintained on a cloud storage server as well as private files stored only on-premise on one or more of a client's private data stores. The invention facilitates accessing files on the private client storage system using the cloud storage system, but without having to place the private files on the cloud storage system. The invention also proposes various systems and methods for improving file access for users. In the following description, numerous specific details are set forth in order to provide a thorough understanding of the invention. Those skilled in the art will recognize, however, that the invention may be practiced apart from these specific details. In other instances, details of well-known cloud storage practices and components have been omitted, so as not to unnecessarily obscure the present invention.

Figure 1A:
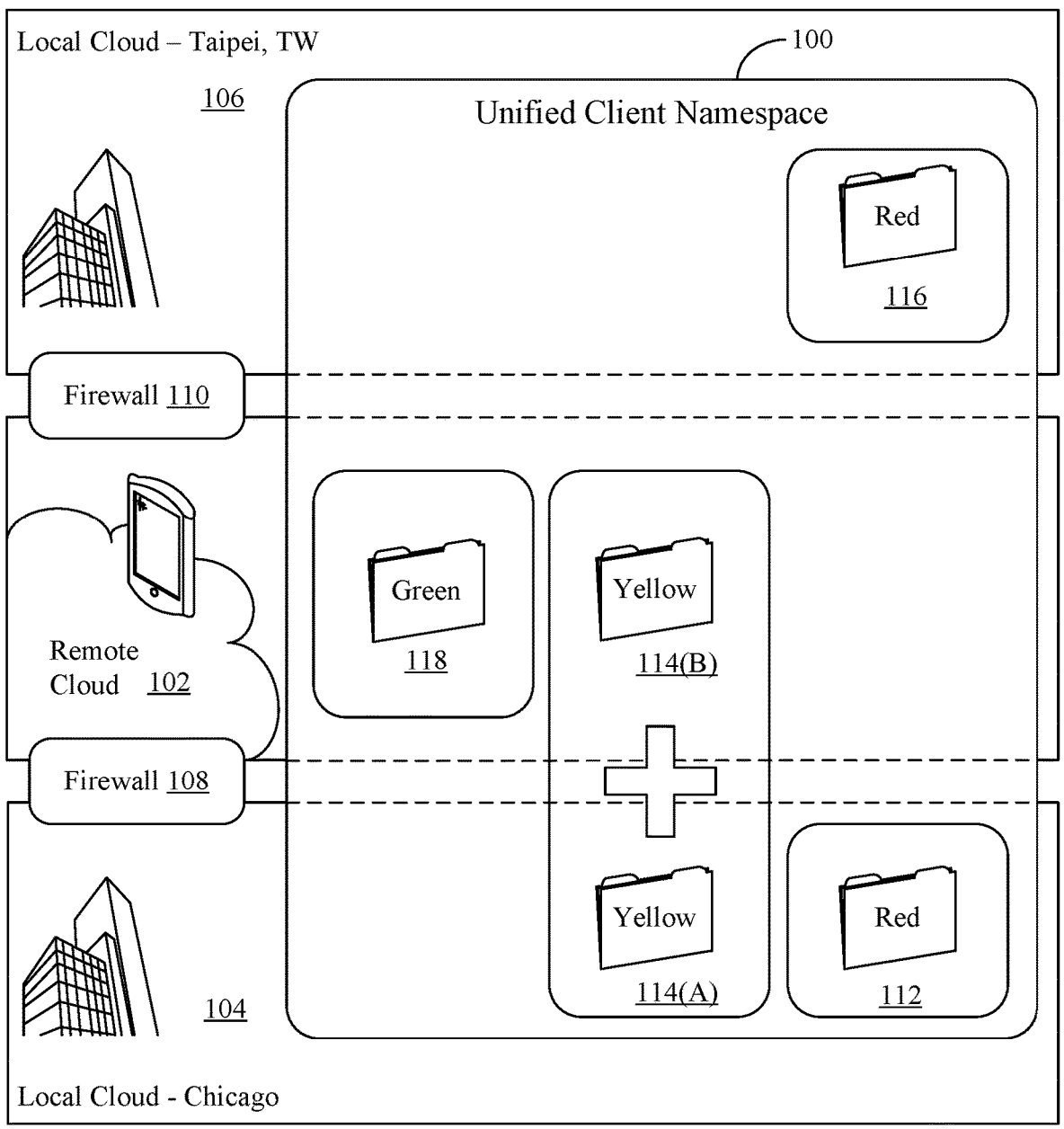
FIG. 1A illustrates a unified client namespace for a distributed file system associated with a client according to the present invention.

FIG. 1A illustrates a unified client namespace 100 according to the present invention. FIG. 1A shows a hybrid cloud storage system that includes a cloud storage system 102 and two private client storage systems 104 and 106 associated with a client, respectively. Cloud storage system 102 is located remotely to client storage systems 104 and 106 and will, therefore, be referred to herein as remote cloud 102. In a particular embodiment, remote cloud 102 provides services to the client on a contract (e.g., subscription basis), as well as to other customers. In contrast, client storage systems 104 and 106 are private systems located on different premises controlled by the client and will, therefore, be referred to as local clouds 104 and 106, respectively. However, local clouds 104 and 106 can be remote to one another. For example, local cloud 104 can be located in Chicago and local cloud 106 can be located in Taipei, Taiwan. Local clouds 104 and 106 are protected from unwanted remote access by firewalls 108 and 110, respectively.

Client namespace 100 unifies a distributed file system associated with the client. Local clouds 104 and 106 include local client file systems thereon. The client file system on local cloud 104 includes a private file system 112 associated with private files and a synchronized file system 114(A) associated with client files that are bi-directionally synchronized with remote cloud 102. The client file system on local cloud 106 includes an entirely private file system 116. The client file system on remote cloud 102 includes client files that are located only on remote cloud 102 as a cloud file system 118 and the associated cloud version of the synchronized file system 114(B).

As an aside, in an alternative embodiment, local cloud 106 could also include a synchronized file system that could be bi-directionally synchronized with remote cloud 102. In such a case, synchronization between remote cloud 102 and local clouds 104 and 106 could be carried out such that all of the synchronized files would be maintained on each of remote cloud 102, local cloud 104, and local cloud 106. Alternatively, the synchronized files originating on one local cloud do not have to be propagated to other local clouds.

Unified client namespace 100 advantageously facilitates three cloud use cases that clients desire. For example, cloud file system 118 is associated with the "green" use case, where the client wants to store and access files only on the remote cloud 102. Synchronized file system 114(A-B) is associated with the "yellow" use case, where client files are maintained both on-premise and in the cloud. The on-premise synchronized file system 114(A) enables fast local access to those files as well as access when a connection to remote cloud 102 cannot be established. The remote synchronized file system 114(B) on remote cloud 102 further provides remote access to the synchronized files and also provides backup protection. Each of private file systems 112 and 116 represent the "red" use case, where the private file system must remain on-premise on a private storage system associated with the client due to security and confidentiality reasons and/or because the private files are too large to migrate to the remote cloud 102.

Client namespace 100 advantageously facilitates access to all of the client's file systems 112, 114, 116, and 118 using one namespace, making each of the associated file systems remotely accessible (e.g., via the Internet) even if the file system is a "red" file system 112 and 116 stored only on a client's premises. In other words, the invention facilitates remote access to private file systems that exist only on a local cloud by using remote cloud 102, but without ever placing the private file systems (either client metadata or data) in the remote cloud 102. Users can access any files in the client namespace from any location using a personal computer or mobile device, and users can browse private storage and download and upload files on the private storage as if the files were hosted in the remote cloud 102. Moreover, the invention provides these abilities while permitting IT to control access to the file systems.

In the present embodiment, the unified client namespace 100 is stored on and maintained by remote cloud 102. However, embodiments are possible where client namespace 100 can be stored on and maintained by any, or all, of remote cloud 102 and local clouds 104 and 106. Additionally, while only one remote cloud and two local clouds are shown for simplicity, the client namespace concept of the present invention can be extended to situations having any number of storage systems.

Figure 1B:
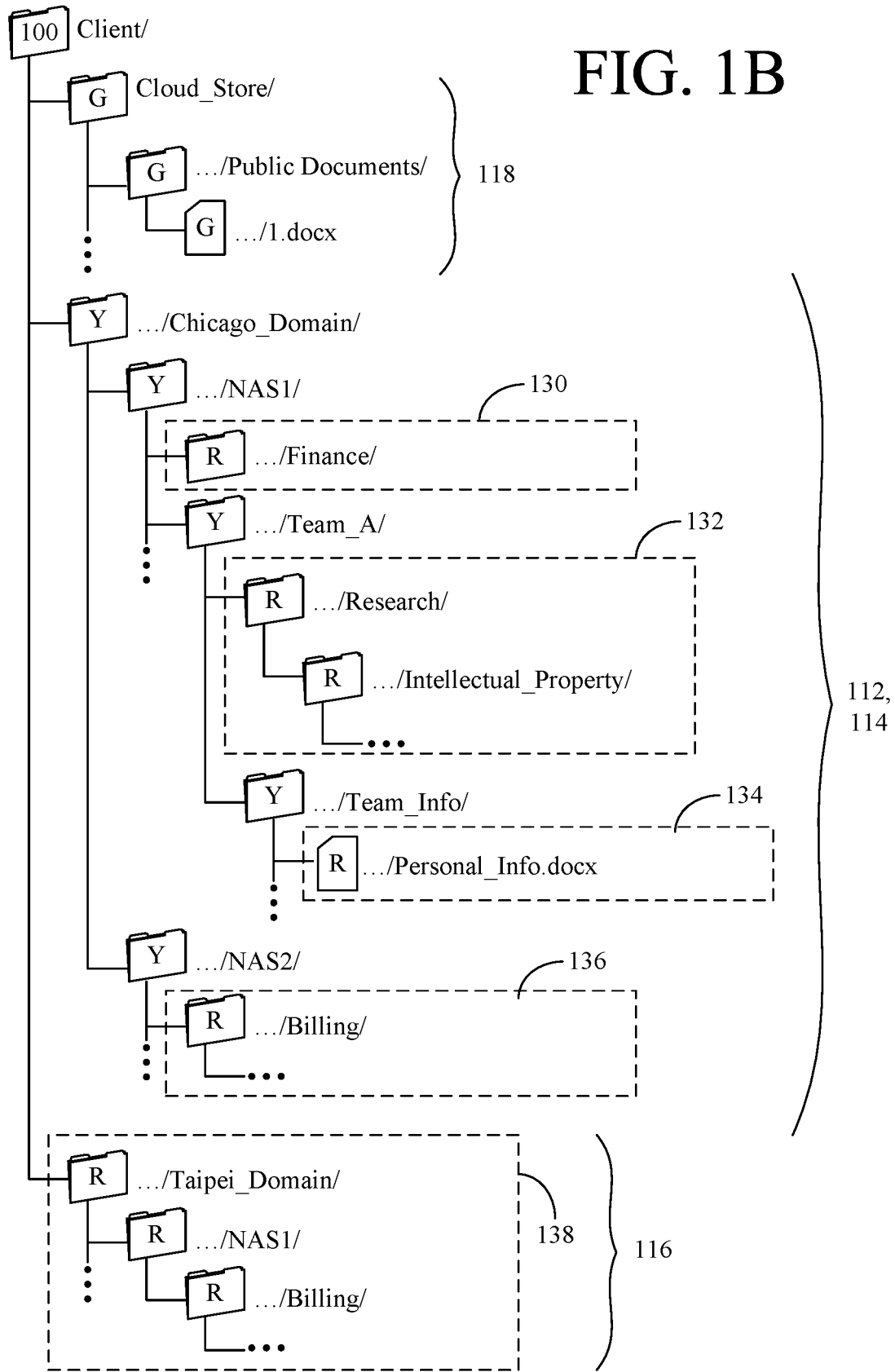
FIG. 1B also illustrates the unified client namespace of FIG. 1A.

FIG. 1B is a hierarchical representation of client namespace 100 that facilitates access to the client's distributed file system on all of clouds 102, 104, and 106 by providing user access to private file system 112, synchronized file system 114, private file system 116 and cloud file system 118. As shown, client namespace 100 encompasses multiple domains (e.g., the domains associated with local clouds 104 and 106) and each domain can include multiple data storage devices (e.g., local cloud 104 includes two network attached storage (NAS) devices—NAS1 and NAS2).

Client namespace 100 aggregates namespaces for green and yellow file system objects associated with green file system 118 and yellow file system 114(B). Green file system objects (e.g., files and folders) are marked with a "G" whereas yellow file system objects (e.g., files and folders) are marked with a "Y". Client namespace 100 includes complete namespaces for the green and yellow file systems 118 and 114(B) because data and metadata for the green and yellow objects are stored on remote cloud 102.

Figure 1C:
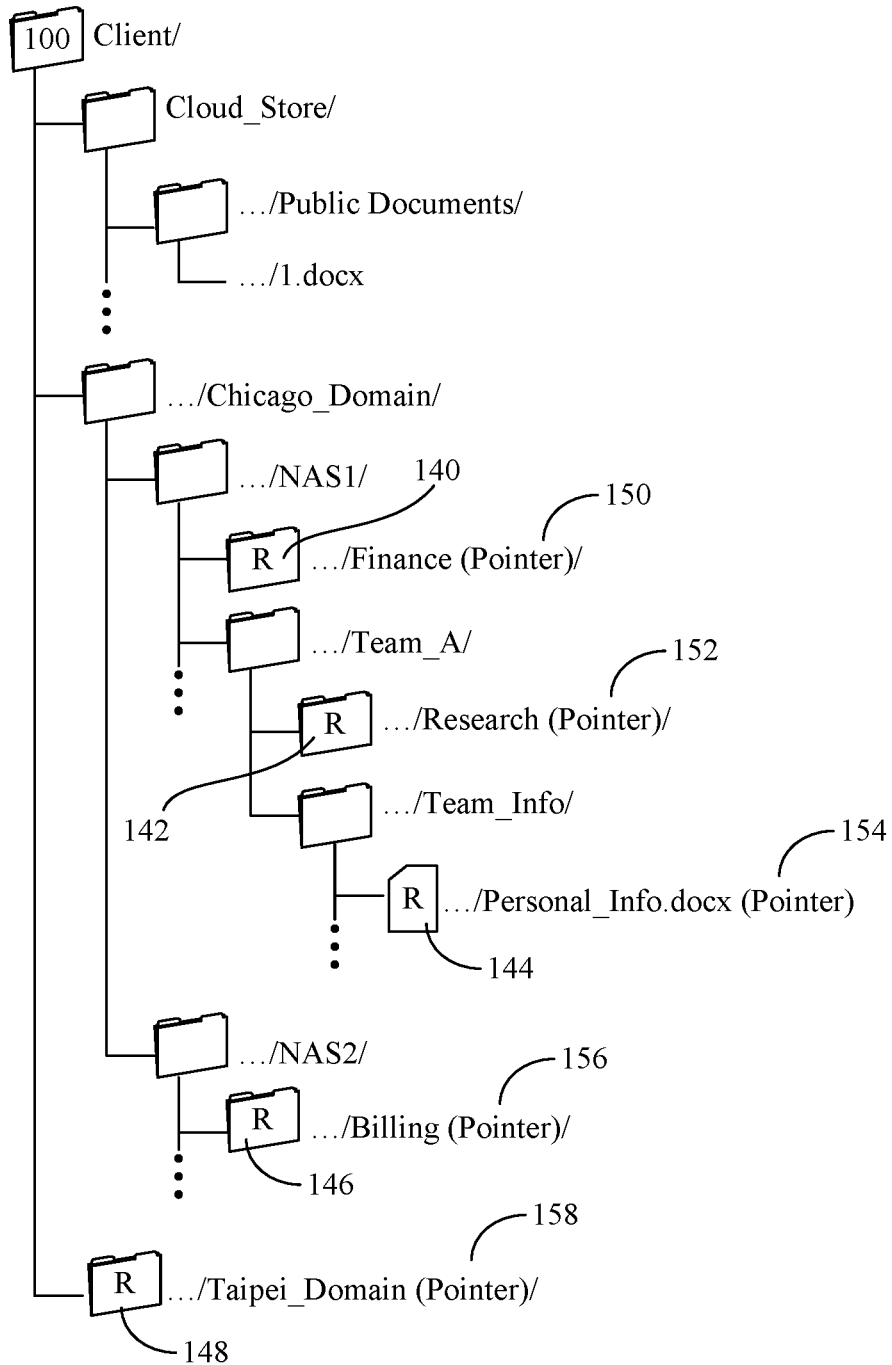
FIG. 1C also illustrates the unified client namespace of FIG. 1A.

However, because red file systems 112 and 116 are privately stored on local clouds 104 and 106, remote cloud 102 does not include the information (e.g., client metadata associated with the red file systems) needed to represent the directory trees for red namespace portions 130-138 in client namespace. Rather, as shown in FIG. 1C, the red namespace portions 130-138 are represented in client namespace 100 as red nodes 140-148 at top red levels in the hierarchy of client namespace 100. Remote cloud 102 further associates each red node 140-148 with a respective red namespace pointer 150-158 that points to an associated one of local clouds 104 and 106 where information representing the associated red namespace portion 130-138 is stored. (Red file system objects (e.g., files and folders) and red nodes are marked with an "R" in FIGS. 1B and 1C.)

When a user (via a user device) accesses a red node 140-148, remote cloud 102 utilizes the associated red namespace pointer 140-148 to cause a separate connection to be established between the user device and an associated one of local clouds 104 and 106. The red namespace pointers 140-148 can also point to red namespace information (e.g., client metadata) on the associated local cloud. The local cloud, in turn, generates and provides the accessed red namespace portion 130-138 to the user device via the separate connection. For example, if a user accessed any of red nodes 140, 142, 144, and 146, the user would be connected with local cloud 104, and local cloud 104 would provide the associated red namespaces 130-136, respectively, to the user. Alternatively, if the user accessed red node 148, the user would be connected with local cloud 106, and local cloud 106 would provide the associated red namespace 138 to the user.

As a particular example, if a user was connected to remote cloud 102 and was browsing client namespace 100 (e.g., as a mapped drive(s), etc.), remote cloud 102 would provide the namespace for green file system 118 and yellow file system 114 to the user. However, if the user attempted to access the folder associated with red node 142, the user would be separately connected (e.g., redirected using HTTPS endpoint information) to local cloud 104. Thereafter, local cloud 104 would provide the user with the red namespace portion 132 (if the user was so authorized). The user could then access other objects in the red namespace portion 132. If the user left the red namespace portion 132 for a yellow or green portion, the remote cloud 102 would again provide the namespace to the user (e.g., the user would be redirected to the remote cloud 102).

While connected to the local cloud, the user has access to the red file systems 112 and 116 in accordance with that user's permissions on the local cloud. A user can perform typical file operations within the namespace, such as file download, file upload, file moves, etc., in accordance with the user's permissions. However, some file system operations might not be permitted, such as moving a red object into a green or yellow portion of the namespace.

To the user, accessing client file system objects associated with client namespace 100 appears contiguous and unified even when accessing the red namespace portions 130-138 and red file system objects. However, while the present invention facilitates access to the red namespace portions 130-138 and to associated portions the red file systems 112 and 116 using client namespace 100 and remote cloud 102, actual user access to the red namespace portions 130-138 and the red file systems 112 and 116 are accomplished apart from remote cloud 102. In this manner, the logic for user access (control plane) is advantageously separated from the actual data storage (storage plane).

There are several clarifications that should be made. First, the red namespace portions 130-138 are shown rather simplistically for the sake of clarity. It should be understood however, that red namespace portions (e.g., portions 130-132 and 136-138) can include any number of nested red objects, such as files and folders. It should also be understood that red namespace portions (e.g., portion 134) can correspond to a single red file object or to an entire domain (e.g., red namespace 138). Additionally, if a red object is a folder, every object nested within that folder will also be red. As will be understood, a client can add and remove red namespace portions to client namespace 100 as they see fit. Accordingly, the names given to the red nodes 140-148 might not correspond to the names of their associated locations in the private namespaces (e.g., for security reasons).

Figure 2:
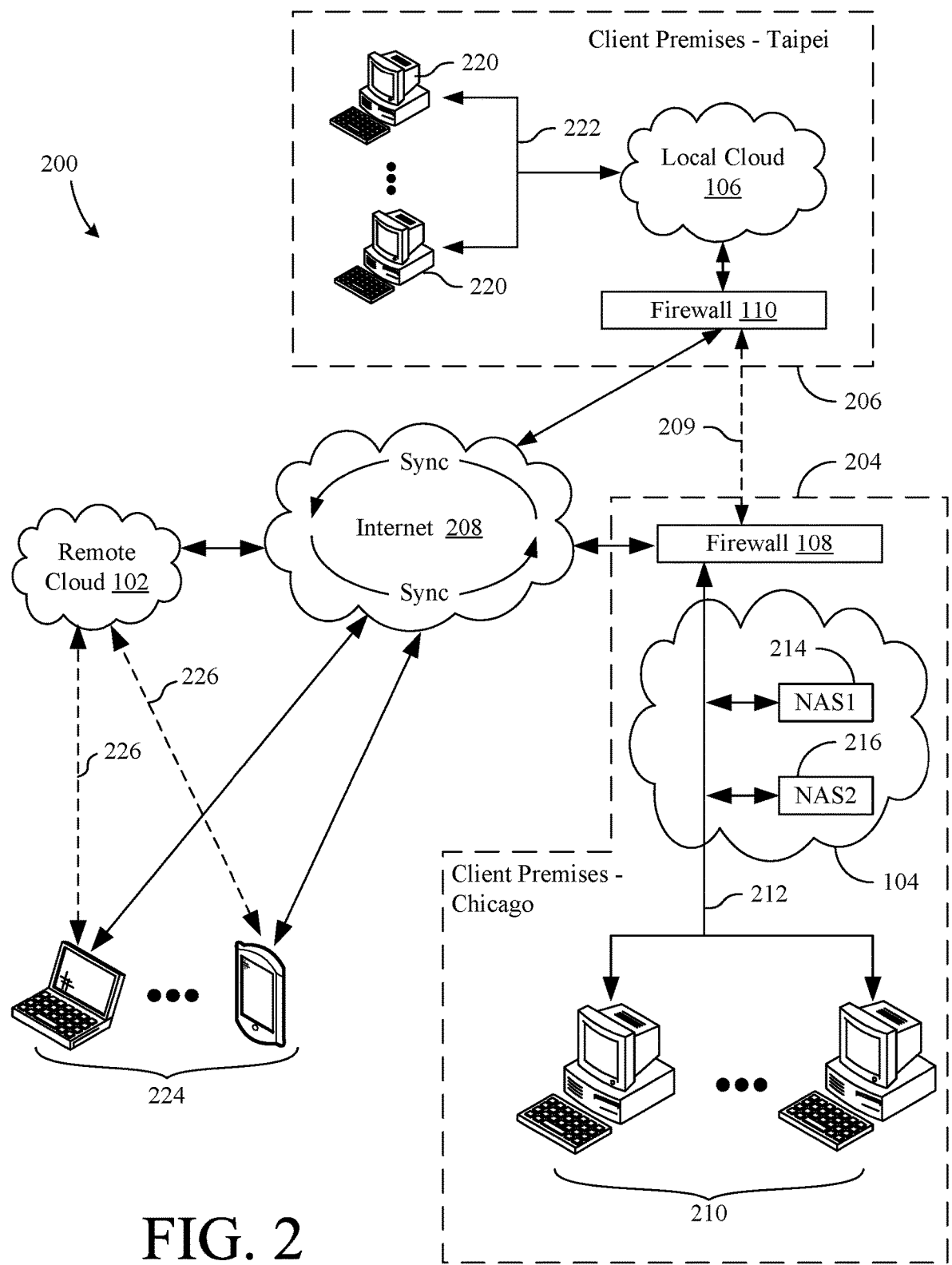
FIG. 2 is a diagram of a hybrid cloud computing system according to one embodiment of the present invention.

FIG. 2 is diagram of a hybrid cloud storage system 200 according to one embodiment of the present invention. FIG. 2 shows that remote cloud 102 is remotely located from two client sites 204 and 206 (e.g., Chicago and Taipei), which comprise local clouds 104 and 106, respectively. Remote cloud 102, local cloud 104, and local cloud 106 communicate with each other via the Internet 208, although the invention is not so limited and other internetworks can be used. For example, local clouds 104 and 106 might communicate over a private network 209. Internet 208 also facilitates synchronizing client files between remote cloud 102 and local cloud 104. Internet 208 will be omitted in subsequent figures to simplify those drawings.

Local cloud 104 can be hosted, for example, by one or more file servers in an office 204 and is, therefore, sometimes referred to as an office local cloud (OLC). In the present embodiment, local cloud 104 includes two enhanced network-attached-storage (NAS) devices 214 and 216. Local cloud 104 can also include other client storage devices, such as a desktop computer (not shown). Indeed, many client storage configurations can be employed.

Local users 210 can locally access private file system 112 and synchronized file system 114(A) via a local network 212. Local users 210 can also access the distributed client file system associated with the client namespace 100 by interfacing with remote cloud 102. Local cloud 106 can also be hosted, for example, by one or more file servers in a second office 206 associated with the client. Local users 220 at office 206 can locally access private file system 116 via a local network 222. Local users 220 can also access the distributed client file system associated with the client namespace 100 by accessing remote cloud 102.

Remote cloud 102 can be implemented, for example, using one or more file servers as will be described in more detail below. Client namespace 100 is maintained by remote cloud 102. A plurality of remote users 224 associated with the client can access unified client namespace 100 by accessing remote cloud 102, either via Internet 106, or via some other connection 226 with remote cloud 102. Using client namespace 100, remote cloud 102 can extend file access for the remote users 224 to the client file systems on local clouds 104 and 106.

Figure 3:
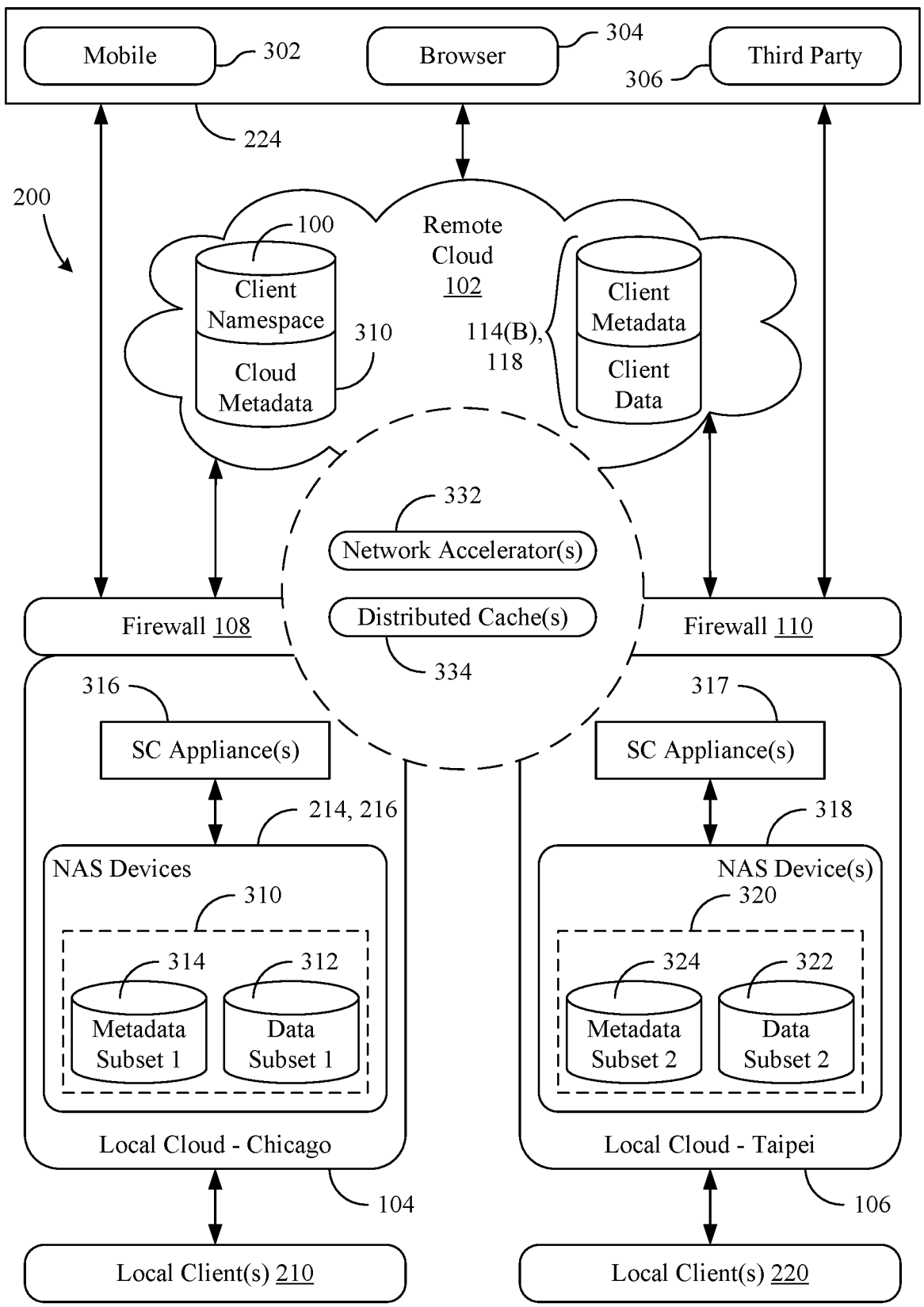
FIG. 3 is a diagram showing the hybrid cloud computing system of FIG. 2 in greater detail.

FIG. 3 is a relational block diagram showing hybrid cloud computing system 200 of FIG. 2 in greater detail. As shown in FIG. 3, the present invention supports multiple ways for remote users 224 to access hybrid cloud storage system 200. For example, remote user 224 can comprise a mobile device 224 (e.g., a tablet, smart phone, etc.) that accesses system 200 using a mobile client application 302. Remote users 224 can also comprises a terminal 224, such as a desktop computer or mobile device, that interacts with system 200 using HTTP, for example, via a web browser 304. As still another example, remote user 224 can comprise a device that accesses system 200 using a third-party application 306. Remote user 224 is operative to establish a connection with remote cloud 102, authenticate with remote cloud 102 (e.g., via a dedicated login with remote cloud 102, using an identity provided by an identity provider (e.g., OpenID), an enterprise ID, etc.), and query remote cloud 102 for access to client namespace 100 and the associated distributed file system. Remote user 224 can also perform file system operations (e.g., download, upload, move, create, delete, etc.) on the distributed file system.

As discussed above, local cloud 104 includes two NAS devices 214 and 216. Only NAS device 214 is shown in FIG. 3 for simplicity. The client file system (including private file system 112 and synchronized file system 114A) stored on NAS device 214 represents a first subset 310 of the client's distributed file system. Each client file in subset 310 includes a data file 312 and associated client metadata 314. In the case of synchronized file system 114A, both the data file and the associated client metadata for each synchronized file are synchronized with remote cloud 102. Therefore, because remote cloud 102 has the metadata for synchronized file system 114(B), remote cloud 102 can build the portion of client namespace 100 associated with the yellow file system. However, in the case of private file system 112, neither the private client metadata 314 nor the private data files 312 are provided to remote cloud 102.

Local cloud 104 also includes one or more storage connect (SC) appliances 316, which front NAS devices 214 and 216. SC appliances can be implemented as virtual machines and/or in hardware at the client locations 204 and 206. SC appliance 316 facilitates access to the distributed file system on behalf of local clients 210 via remote cloud 102, for example by exposing one or more HTTPS endpoints. SC appliance 316 also facilitates access to private file system 112 on behalf of users remotely accessing local cloud (e.g., remote users 224, local clients 220 from local cloud 106 (who are remote to local cloud 104), etc.). All remote communications with SC appliance 316 (communication between local clouds 104 and 106 not shown in FIG. 3) are through the firewall 108, thereby maintaining security for the private file system 112. Furthermore, remote users 224 and local clients 220 associated with local cloud 106 have "cloud-like" access to the private file system 112 without having to migrate the private file system 112 to remote cloud 102.

SC Appliance 316 also enables client administrators to identify portions of the private file system 112 to be accessed remotely, and then provides information associated with such portions to remote cloud 102. For example, HTTPS endpoint information associated local cloud 104 and SC appliance 316 could be provided to remote cloud 102. Additionally, pointers to portions of client metadata 314 associated with the red namespace portions 130-136 of private file system 112 could also be provided, either as part of the endpoint definition(s) or as some other type. Providing such information facilitates access for remote agents to the private file system 112.

Local cloud 106 is similar to local cloud 104 and includes at least one SC appliance 317 fronting at least one enhanced NAS device 318. NAS device 318 stores a second subset 320 of the client's distributed file system. Each client file in the second subset 320 includes a data file 322 and associated client metadata 324. Because second subset 320 includes private file system 116, no client metadata 324 or data files 322 are shared with remote cloud 102. Rather, SC appliance 317 provides access information (e.g., HTTPS endpoint information, etc.) associated with private file system 116 to remote cloud 102 to facilitate access by remote users.

FIG. 3 further shows that remote cloud 102 stores client namespace 100 as well as cloud metadata 310. Remote cloud 102 uses cloud metadata 310 to generate client namespace 100 for users associated with the client. Remote cloud 102 generates cloud metadata 310 for each green and yellow file system object in client namespace 100 by associating the client metadata for those objects with cloud attributes. Examples of cloud attributes include file ownership, access control information, synchronization information, location information indicating each location within hybrid cloud system 200 where a particular file is stored, search tags, file replication policies, third party attribute blobs, etc.

For each red namespace portion (e.g., red namespace portions 130-138), cloud metadata 310 defines a red node (e.g., red nodes 150-158) and a pointer (e.g., red namespace pointers 140-148) to the client storage system (e.g., local clouds 104 and 106) where the associated red namespace information can be accessed. Examples of cloud metadata 310 will be discussed below.

FIG. 3 further shows that network accelerators 332 and caches 334 are distributed across hybrid cloud storage system 200. Network accelerators 332 and caches 334 address latency and file consistency concerns across a client's distributed network. Both are deployable on virtual machines. Network accelerators 332 perform tasks such as early SSL termination (to reduce SSL round-trips, a warmed up back haul SSL connection pool can be used). Distributed caches 334 comprise caching proxies that cache frequently used data, such as folder listings closer to network edges. Caches 334 can also operate on different caching policies as determined by the client. Caching operations on client data can also be communicated across the elements of hybrid cloud storage system 200 to maintain data integrity.

The present invention provides "cloud-like" file access, including access to private files stored only on client premises, across a client's network in various ways. FIGS. 4A-4E provide particular examples of such access.

Figure 4A:
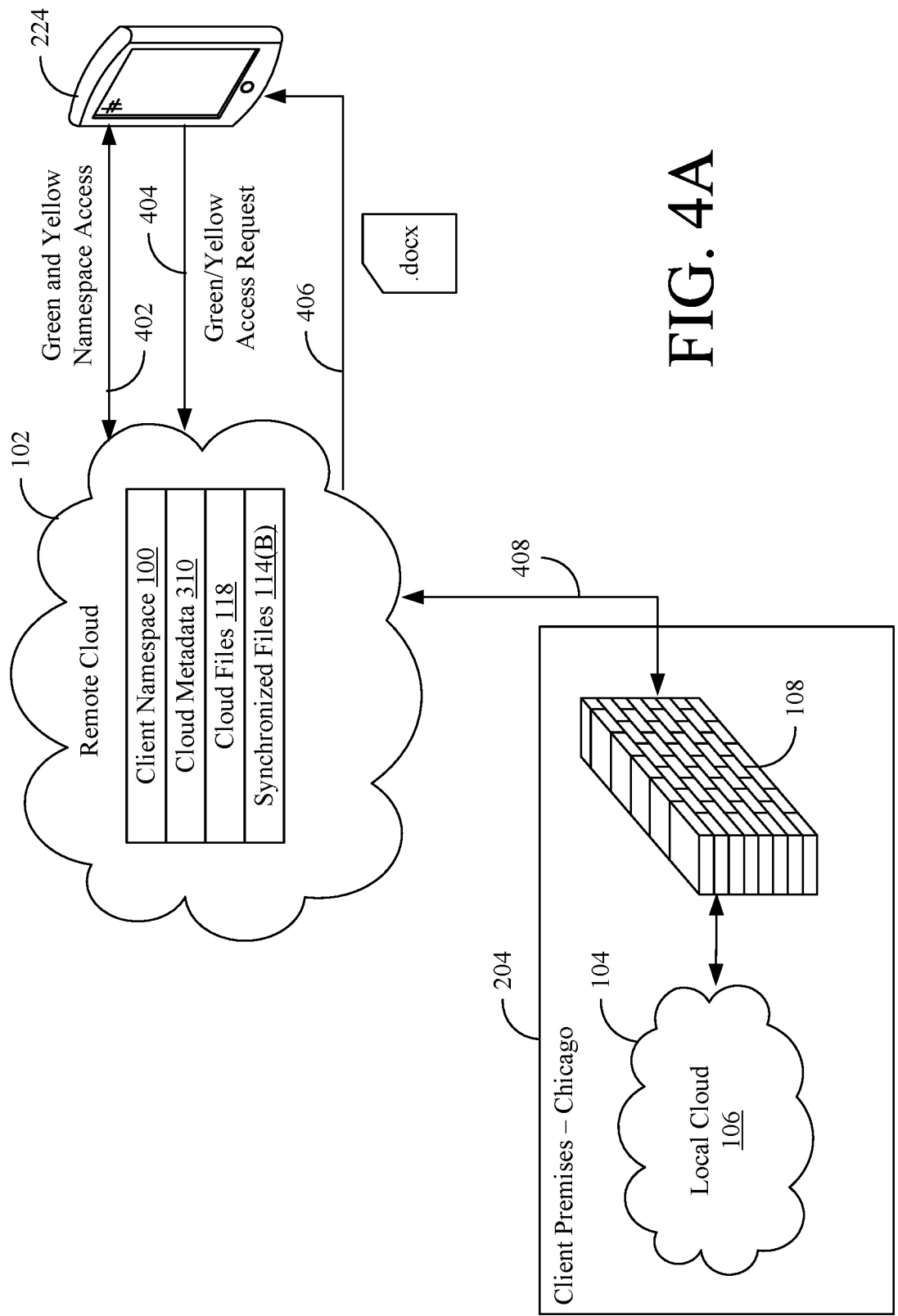
FIG. 4A shows a method for providing access to files according to the invention.

FIG. 4A shows a remote user 224 accessing a green or yellow object, in this case a file, stored on remote cloud 102 via a mobile device. Remote user 224 establishes a connection with remote cloud 102 via the internet 208 using a mobile app. 302 or a web browser 304. Responsive to remote user 224 and remote cloud 102 establishing a connection, remote user 224 requests access to the green and/or yellow file systems of client namespace 100. Remote cloud 102 requests authentication from remote user 224, and if remote user 224 possesses the proper credentials, remote cloud grants access to the portions of green and yellow file systems of client namespace 100 that the user is permitted to access. The above process is represented generally as connection 402 in FIG. 4A.

Remote cloud 102 provides a virtual representation (e.g., a directory tree) of client namespace 100 to remote user 102. Remote cloud 102 generates the virtual representation based on the client metadata 310. Subsequently, remote user 224 makes a request 404 to access to a green or yellow file, which in this example is part of the cloud file system 118 or synchronized file system 114(B), stored on remote cloud 102. Remote cloud 102 then serves the file to remote user 224 in a communication 406. Subsequent communications between the remote user 224 and the remote cloud 102 can take place, for example, should the user want to make changes to the accessed file or access client namespace 100 further.

It should be noted that remote cloud 102 can enforce permissions on the types and extent of file access provided to remote user 224. For example, remote cloud 102 can implement permissions management like that described in U.S. application Ser. No. 13/689,648, filed on Nov. 29, 2012 by Wijayaratne et al. and entitled "Flexible Permission Management Framework For Cloud Attached File Systems", which is incorporated by reference herein in its entirety. FIG. 4A also illustrates a connection 408 between local cloud 104 and remote cloud 102 that facilitates synchronizing file systems 114(A) and 114(B) and updating client namespace 100.

Figure 4B:
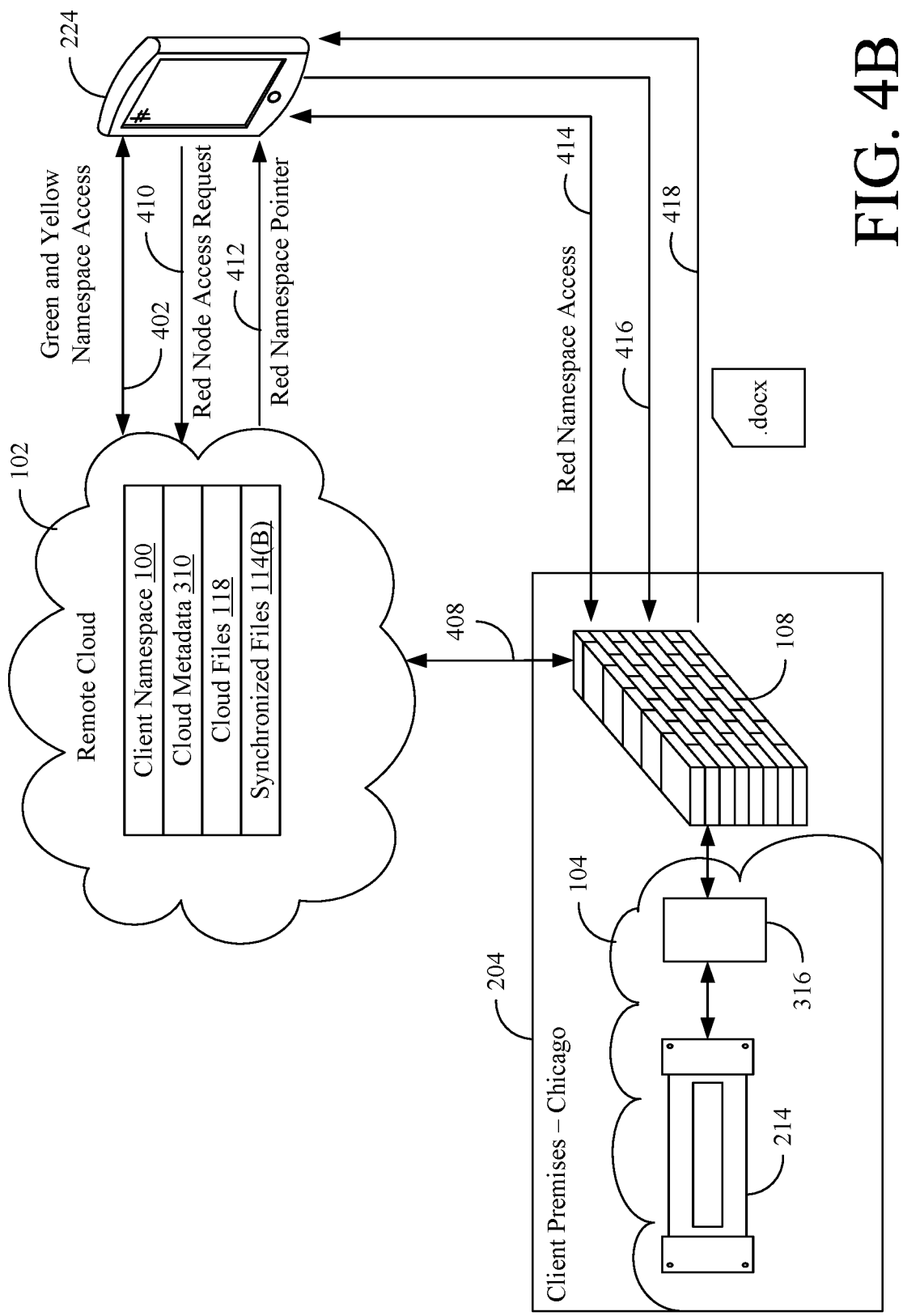
FIG. 4B shows another method for providing access to files according to the invention.

FIG. 4B shows remote user 224 accessing green and yellow portions of client namespace 100 on remote cloud 102 via connection 402 as discussed in FIG. 4A. Then, in a communication 410, remote user 224 requests access to a red node (e.g., one of red nodes 140-148) of client namespace 100. In response, remote cloud 102 accesses the cloud metadata 310 for the requested red node and gets a red namespace pointer (e.g., one of red namespace pointers 150-158) to the associated red namespace (e.g., red namespace portions 130-138) on local cloud 104. Remote cloud 102 then provides the red namespace pointer to remote user 224 in a communication 412.

The red namespace pointer includes information enabling remote user 224 to both connect with local cloud 104 and to access the desired red namespace portion on local cloud 104. For example, the red namespace pointer can include an IP address associated with local cloud 104, a port number, IP address type, HTTPS endpoints information, etc. and/or any combination thereof.

Once remote device 224 receives the red namespace pointer, remote user 224 establishes a separate connection 414 (e.g., a secure HTTPS connection, an encrypted connection, etc.) with SC appliance 316 through firewall 108. SC appliance 316 can authenticate remote user 224 (e.g., a username and password, secondary authentication, security token-based, etc.) before establishing connection 414. If the user is not authenticated, the connection 414 with remote user 224 is denied. However, if the user is authenticated, SC appliance 316 provides the requested red namespace access to remote user 224 via connection 414.

In response to the red namespace access, remote user 224 can make a request 416 for access to a red file. SC appliance 316 proxies this request to the underlying NAS device 214, which returns the requested red file to SC appliance 316. SC appliance 316 can then provide the requested red file to remote user 224 in a communication 418. Remote user 224 can then continue access to the red namespace via connection 414, whereby the remote user 224 can make other file system operations to the red file system on local cloud 104 within the user's authority.

In the present embodiment, while remote cloud 102 facilitates extending remote access to the red namespace on local cloud 104, none of the private red namespace information or red objects are passed through the remote cloud 102. Rather, that data is passed over secure, encrypted connection 414 established directly between remote user 224 and local cloud 104. Accordingly, private client data is securely maintained behind firewall 108.

Figure 4C:
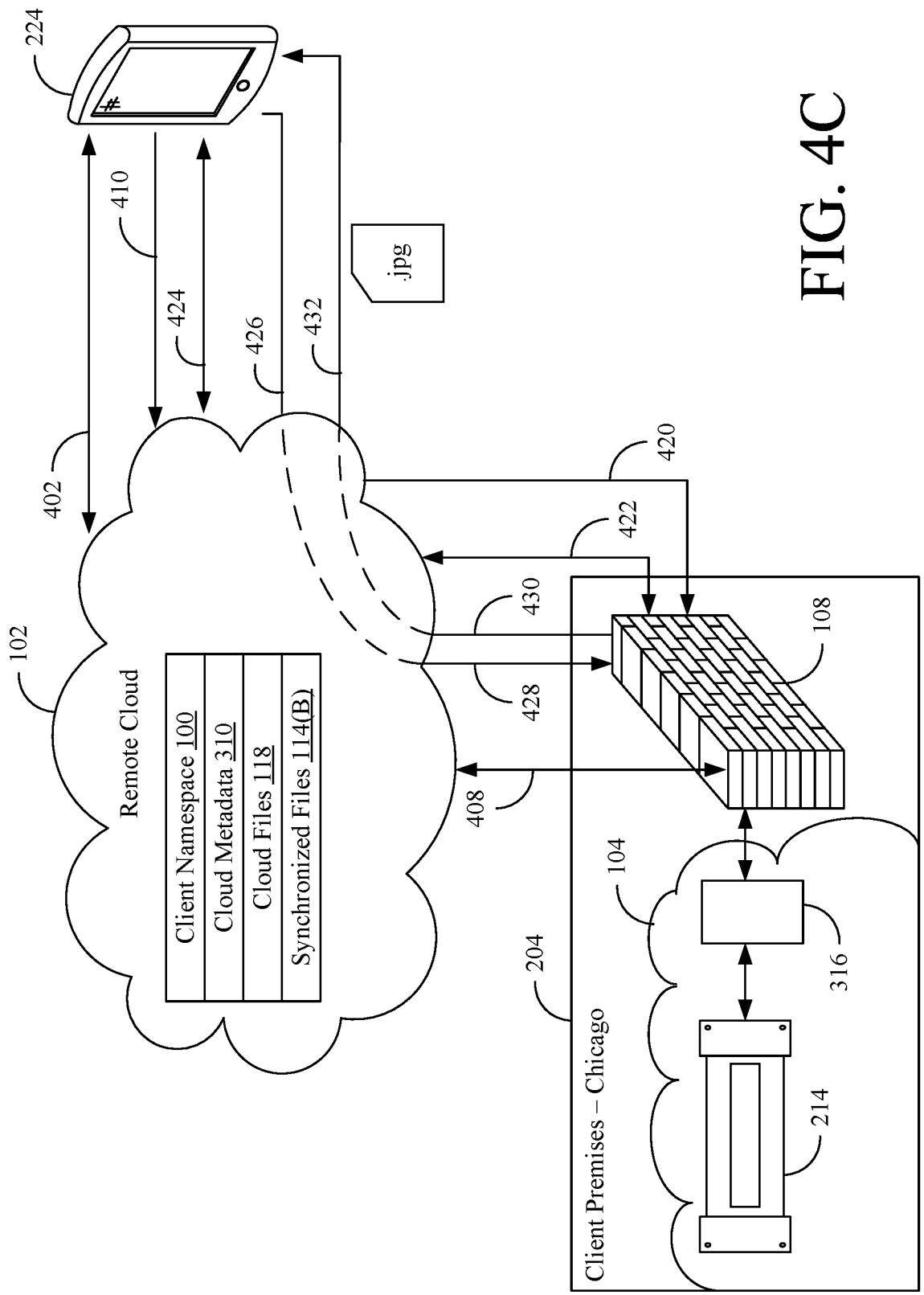
FIG. 4C shows another method for providing access to files according to the invention.

FIG. 4C shows another embodiment in which red file system access is provided to remote user 224 using remote cloud 102 as a conduit. In this embodiment, remote user 224 accesses the green and yellow namespaces of client namespace 100 via communications 402 as described above. Like in FIG. 4B, remote user 224 then requests access to a red node of client namespace 100 via a communication 410.

In response to communication 410, remote cloud 102 accesses the cloud metadata 310 for the requested red node and gets a red namespace pointer to the associated red namespace on local cloud 104. Remote cloud 102 then uses the red namespace pointer to request 420 access to the requested red namespace from SC appliance 316. SC appliance 316 performs any authentication (e.g., using an OAuth token, etc.) needed on remote cloud 102, and then provides access to the requested red namespace to remote cloud 102 via communications 422. Remote cloud 102, in turn, proxies the red namespace access to remote user 224 via communications 424.

Subsequently, remote user 224 makes a red file request 426 (e.g., a large .jpg file), which remote cloud 102 forwards to SC appliance 316 via communication 428. SC appliance 316, in turn, requests access to the file from NAS device 214. When access is granted, SC appliance 316 provides the requested file to remote cloud via communication 430, and remote cloud 102 provides the requested file to remote user 224 in a communication 432.

Accordingly, remote cloud 102 can be used as a conduit for providing red file access to remote user without permanently storing any files or red file metadata on remote cloud. While data does not flow outside remote cloud 102 in this embodiment, red data can be encrypted for added security. The current embodiment would be useful in a case where very large files (e.g., image files, etc.) are being migrated to remote cloud 102 over time.

Figure 4D:
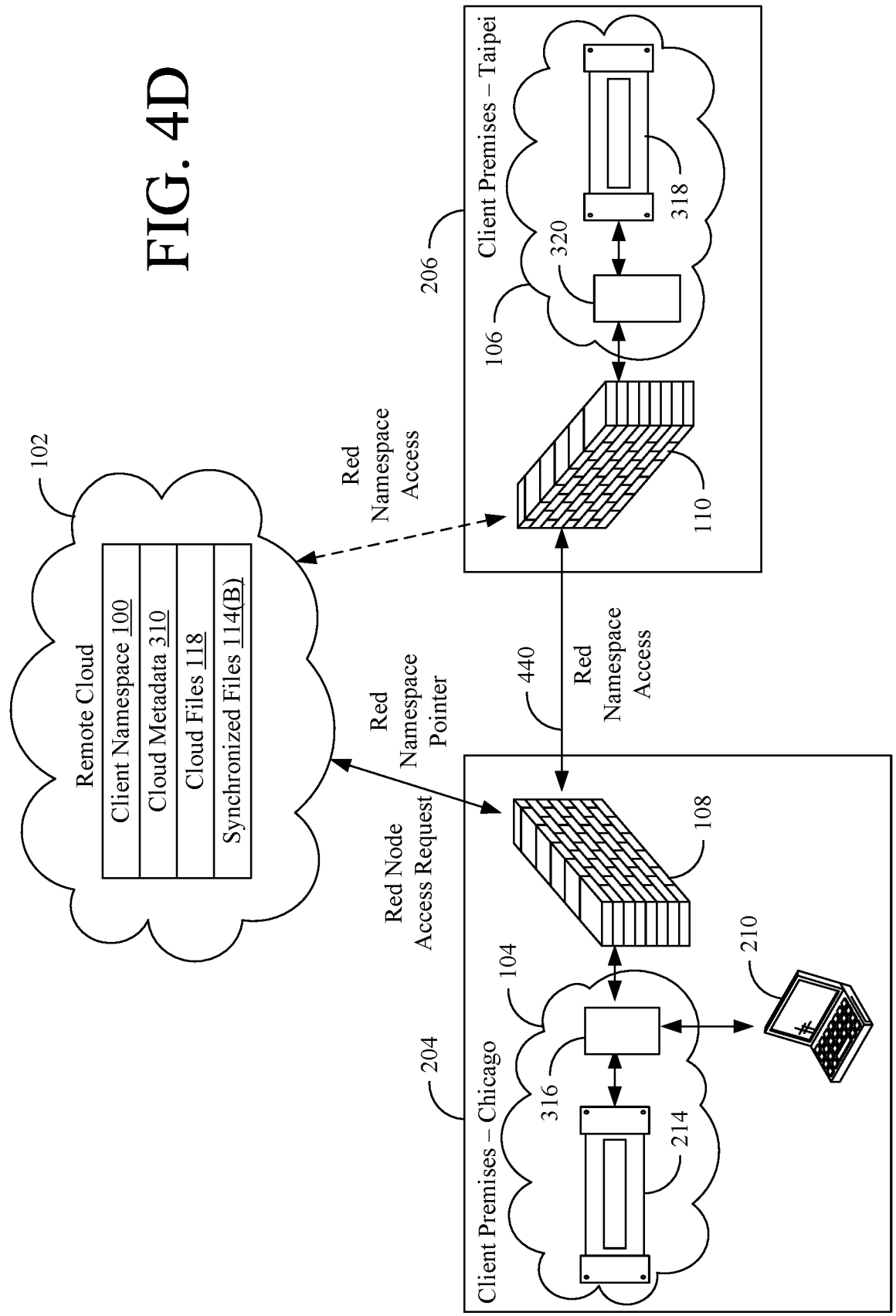
FIG. 4D shows another method for providing access to files according to the invention.

FIG. 4D shows a local user 210 of local cloud 104 accessing a private file of private file system 116 stored on local cloud 106, which is facilitated by remote cloud 102. SC appliance 316 is providing file services to local user 210. SC appliance 316 authenticates local user 210 when local user 210 establishes a connection with local cloud 104. SC appliance 316 has also established a connection with remote cloud 102 and extends local user 210's access to remote cloud 102. Remote cloud 102 provides client namespace 100 to SC appliance 316, such that SC appliance 316 can provide it to local user 210. Local user 210 can access the distributed file system associated with the client, for example, by mapping portions of client namespace 100 as drive(s). In this manner local user 210 can access private file system 116 on local cloud 106.

When local user 210 requests access to a red node 148 associated with the red namespace portion 138 of client namespace 100, SC appliance 316 proxies the red node access request to remote cloud 102 on behalf of local user 210. Remote cloud 102 can proceed in either of two ways. According to the first method, remote cloud 102 obtains a red namespace pointer 158 associated with the requested red namespace portion 138 and provides the red namespace pointer to SC appliance 316. SC appliance 316 then uses the information (e.g., IP address, HTTPS endpoint information, etc.) associated with the pointer 158 to establish a separate connection 440 with SC appliance 320 (apart from remote cloud 102) and access the red namespace portion 138 on behalf of local user 210. SC appliance 320 verifies that local user 210 has permission to access the red namespace portion 138, and if so, provides the red namespace portion 138 to SC appliance 316. SC appliance 316 then extends this access to local user 210. Local user 210 can then perform file system operations on the red namespace 138 in accordance with his/her permissions. This process is advantageous because no private namespace or private file information is transmitted to the remote cloud 102.

Alternatively, remote cloud 102 can connect with the SC appliance 320 on local cloud 106 using the information associated with red namespace pointer 158 and request access to the red namespace portion 138 on behalf of SC appliance 316. If access is granted by SC appliance 320, remote cloud 102 can extend such access to local user 210 via SC appliance 316.

Figure 4E:
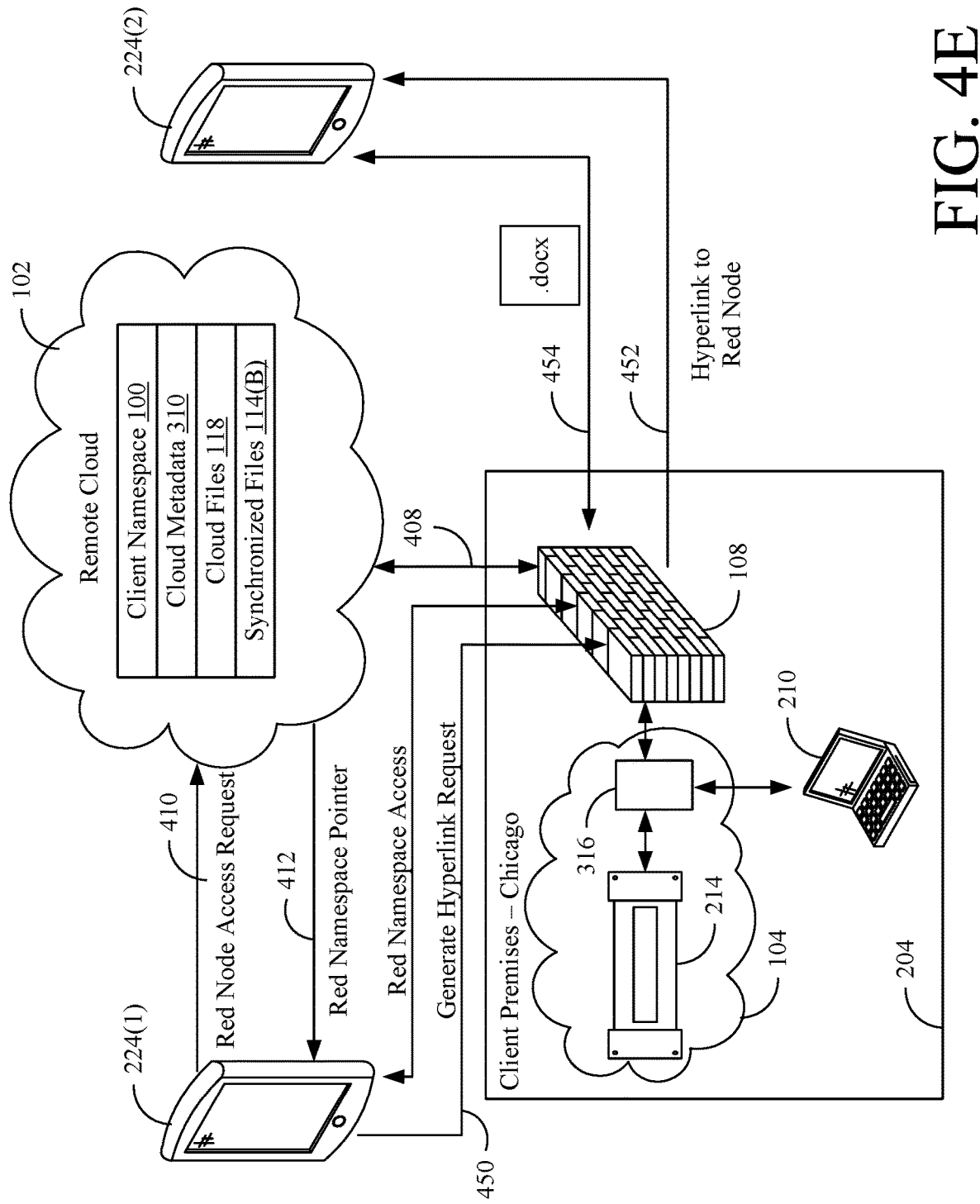
FIG. 4E shows another method for providing access to files according to the invention.

FIG. 4E shows a first remote user 224(1) accessing a red namespace portion on local cloud 104 via SC appliance 316 as discussed above. As shown, first remote user 224(1) makes a generate hyperlink request 450 to SC appliance 316 instructing SC appliance to 316 to generate a hyperlink for a target red object (e.g., red folder or file). SC appliance 316 generates the hyperlink and stores metadata about the hyperlink (e.g., number of clicks to expiration, expiration date and time, password, etc.) locally. SC appliance 316 then provides the hyperlink to a second remote user 224(2) via communication 452 as specified by remote user 224(1). (Alternatively, the hyperlink can be provided to remote user 224(1) who can provide it to remote user 224(2) in some other manner, such as by e-mail.) Remote user 224(2) can then click on the hyperlink and gain access to the target red object as shown at 454. Remote cloud 102 can generate hyperlinks for green and yellow objects also, but metadata associated with those hyperlinks does not need to be stored privately.

FIGS. 4A-4E have now been described with respect to a remote user 224 accessing a private file. However, it should be understood that each of these embodiments and associated methods can also apply to any user that wants remote access to a portion of the distributed file system that the user does not have local access to. Similarly, the above embodiments and methods apply to all types of file access including file uploads, file downloads, file system object moves, etc.

Figure 5:
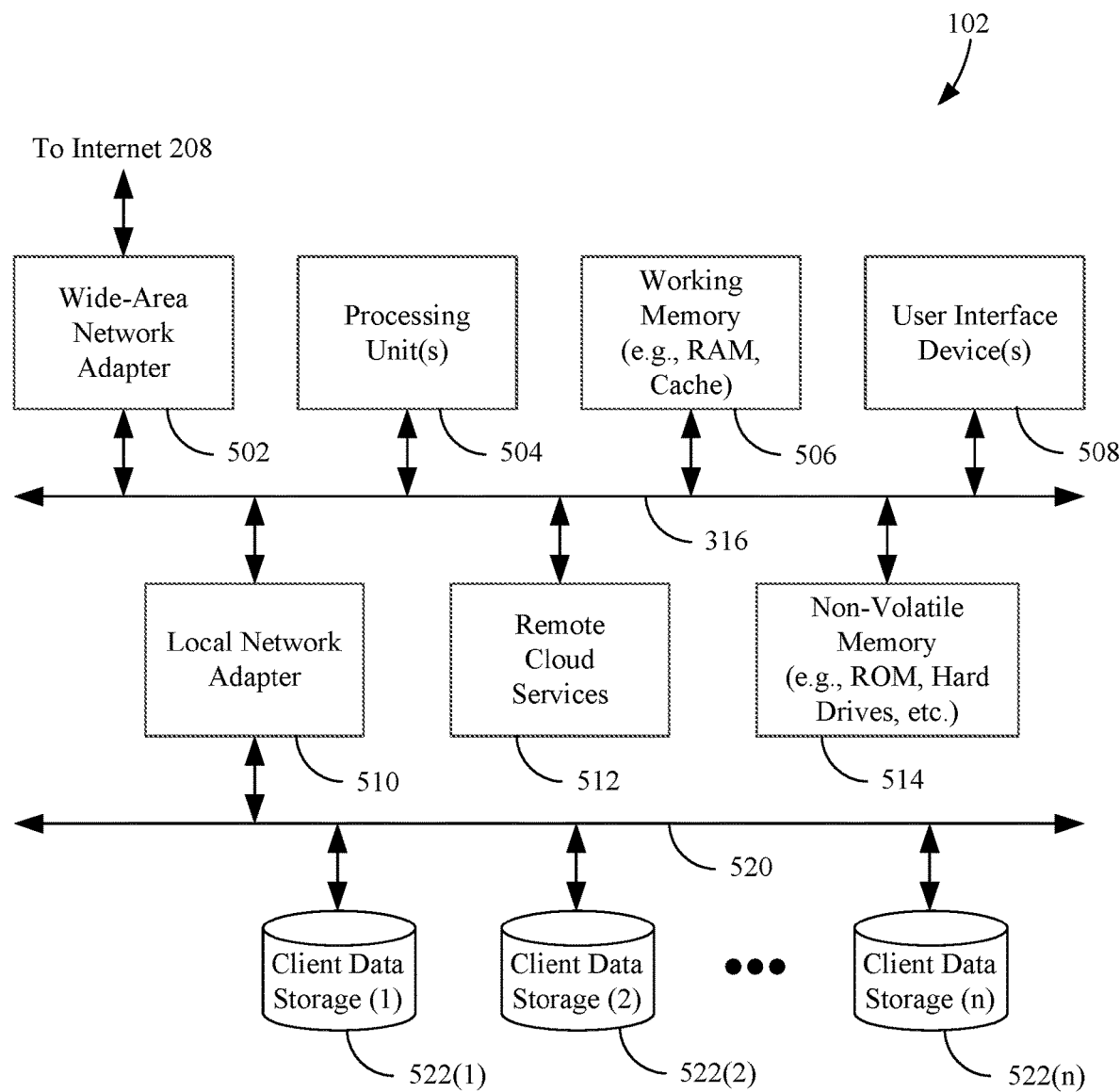
FIG. 5 is a block diagram of a remote cloud server according to the invention.

FIG. 5 is a block diagram of a remote cloud server 102 that implements remote cloud 102. Remote cloud server 102 includes a wide-area network adapter 502, one or more processing units 504, working memory 506, one or more user interface devices 508, a local network adapter 510, a remote cloud services component 512, and non-volatile memory 514, all intercommunicating via an internal bus 516. Processing units(s) 504 impart functionality to remote cloud server 102 by executing code stored in any or all of non-volatile memory 514, working memory 506, and remote cloud services 512. Remote cloud services 512 represents hardware, software, firmware, or some combination thereof, that provides the functionality of remote cloud 102 described herein.

Wide area network adapter 502 provides a means for remote cloud server 102 to communicate with remote users 224 and local clouds 104 and 106 via Internet 208. Local network adapter 510 provides a means for accessing a plurality of data storage devices 522(1-n), via a private network 520. Clients' files (e.g., cloud files 118 and synchronized files 114(B)) are stored in and retrieved from data storage devices 522(1-n) as needed. Additional data storage devices 522(n+) can be added as needed to provide additional storage capacity. In this example embodiment, data storage devices 522(1-n) are network attached storage (NAS) devices, but any suitable type of storage device can be used.

Figure 6:
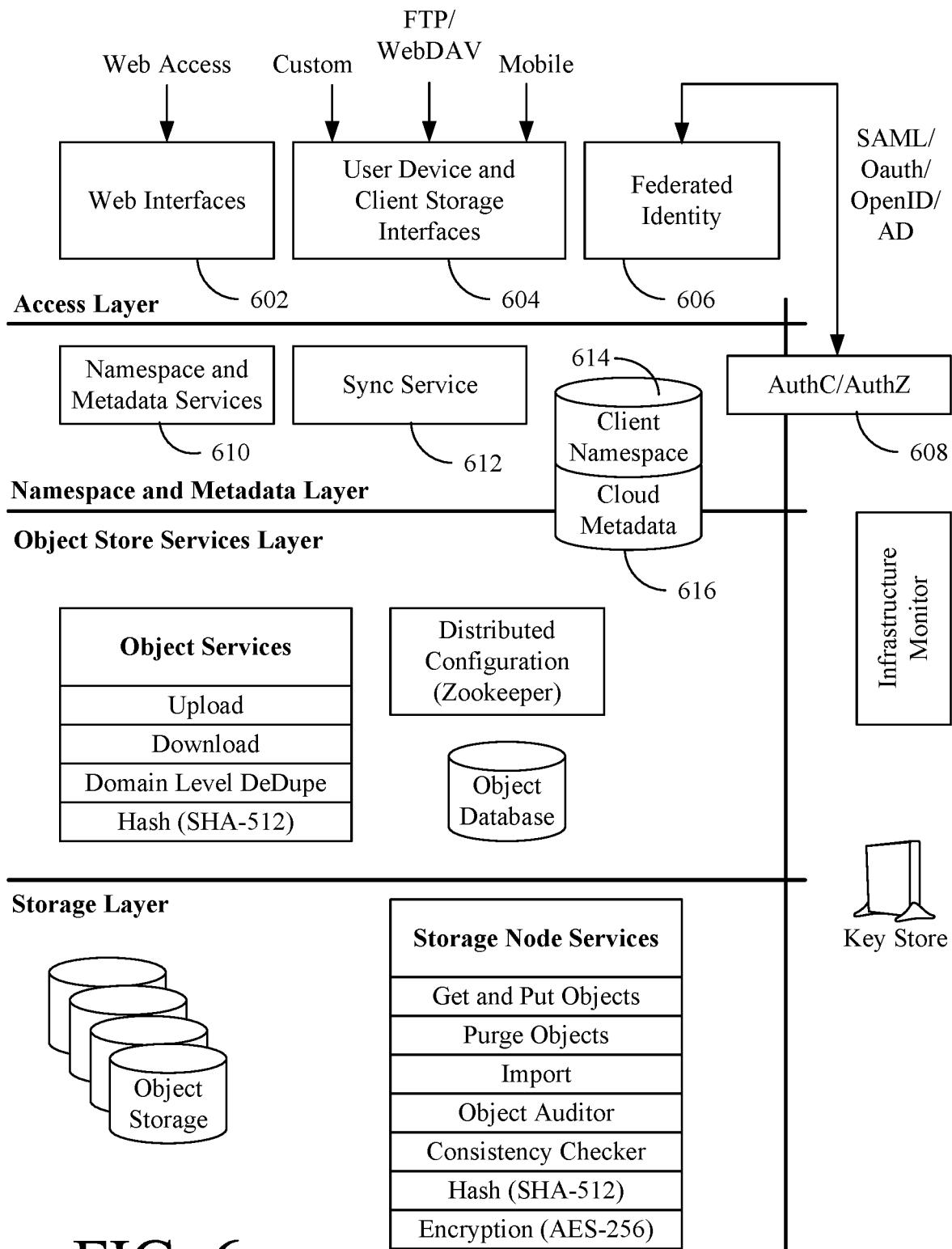
FIG. 6 shows the layered architecture of the remote cloud server of FIG. 5.

FIG. 6 shows the layered architecture of remote cloud 102 in greater detail. Remote cloud 102 includes an Access Layer, a Namespace and Metadata Layer, an Object Store Services Layer, and a Storage Layer. Access Layer handles the incoming requests to remote cloud 102 such as, for example, web, mobile, local, etc. Access layer includes services that facilitate communication between remote cloud 102 and each of remote users 224 and between remote cloud 102 and each of local clouds 104 and 106 at remote sites 204 and 206. Remote cloud 102 exposes various user interfaces. For example, users can access remote cloud 102 using the world wide web via web interfaces 602. As another example, applications on user devices and client stores can access remote cloud 102 via user device and client storage interfaces 604. Protocols and services such as HTTP, File Transfer Protocol (FTP), WebDAV, Common Internet File System (CIFS), and Network File System (NFS), Samba, etc. can be employed. The services of Access Layer can be implemented using file servers such as Apache Tomcat® and Nginx.

The Access Layer also includes a federated identity service 606, which works in conjunction with an authentication and authorization service 608 to provide secure access to remote cloud 102 from remote sources. Federated identity service 606 facilitates access to remote cloud 102 from multiple devices and form factors by extending the trust fabric across devices of the hybrid cloud storage system 200, including to local clouds and mobile devices via browser plug-in or via native applications. Services 606 and 608 can employ popular security and authentication standards (e.g. SAML, OAuth, OpenID, etc.), thus making the exchanges secure and interoperable, while maintaining the ability to provide flexible access to the elements of hybrid cloud storage system 200.

The Namespace and Metadata Layer matches the incoming requests with the appropriate workflow, as well as, the security services such as user authentication and authorization. In addition to service 608, Namespace and Metadata Layer includes namespace and metadata services 610 and a synchronization (sync) service 612. Namespace and metadata services 610 has access to client namespace 100 and cloud metadata 310 and provides distributed file system access to the devices accessing remote cloud 102 via the Access layer, as described herein. For example, namespace and metadata services 610 is operative to provide access to client namespace 100 associated with the client to the Access Layer and receive namespace access requests from the Access Layer. Responsive to a request for access to a red node, namespace and metadata services 610 is operative to retrieve red namespace pointers from database 614 and provide them to the Access Layer for communication to users. Namespace and metadata services 610 is also operative to receive requests for files, query the lower layers for the files (in the case of green and yellow files) and provide those files to the Access Layer. Services 610 can also facilitate the storage of new files in remote cloud a similar manner. Furthermore, namespace and metadata services 610 can also generate cloud metadata 310 associated with a client, and access and modify the cloud metadata 310 in accordance with green and yellow file system changes made by a user. These and other functions of namespace and metadata services 610 will be apparent in view of this disclosure.

Sync service 612 bi-directionally synchronizes the yellow file system 114 associated with client namespace 100 between local cloud 104 and remote cloud 102. When changes are made to the yellow file system either on remote cloud 102 or on local cloud 104, sync service 612 will cause those changes to be synchronized. Synchronization systems and methods are further described in U.S. patent application Ser. No. 13/958,298, filed Aug. 2, 2013 by Wijayaratne et al.

and entitled "System and Method for Event-Based Synchronization of Remote and Local File Systems", which is incorporated by reference herein in its entirety.

The Object Store Services Layer implements various services including maintaining the object database for client files stored on remote cloud 102, distributing the access load across multiple storage nodes (for upload and download), file replication, domain-level de-duplication, selecting the storage layer, hashing, etc. The Storage Layer handles storage services including, for example, storing and retrieving data objects, encryption, object consistency (against bit-rot for example), object purge, etc. The services in these layers can also be implemented using file servers such as Apache Tomcat® and Nginx.

Cloud-based object-storage infrastructures, such as those described in FIGS. 5-6 are further described in U.S. patent application Ser. No. 13/708,040, filed on Dec. 7, 2012 by Shetty et al. and entitled "System And Method Of Implementing An Object Storage Infrastructure For Cloud-Based Services", which is incorporated herein by reference in its entirety.

Figure 7:
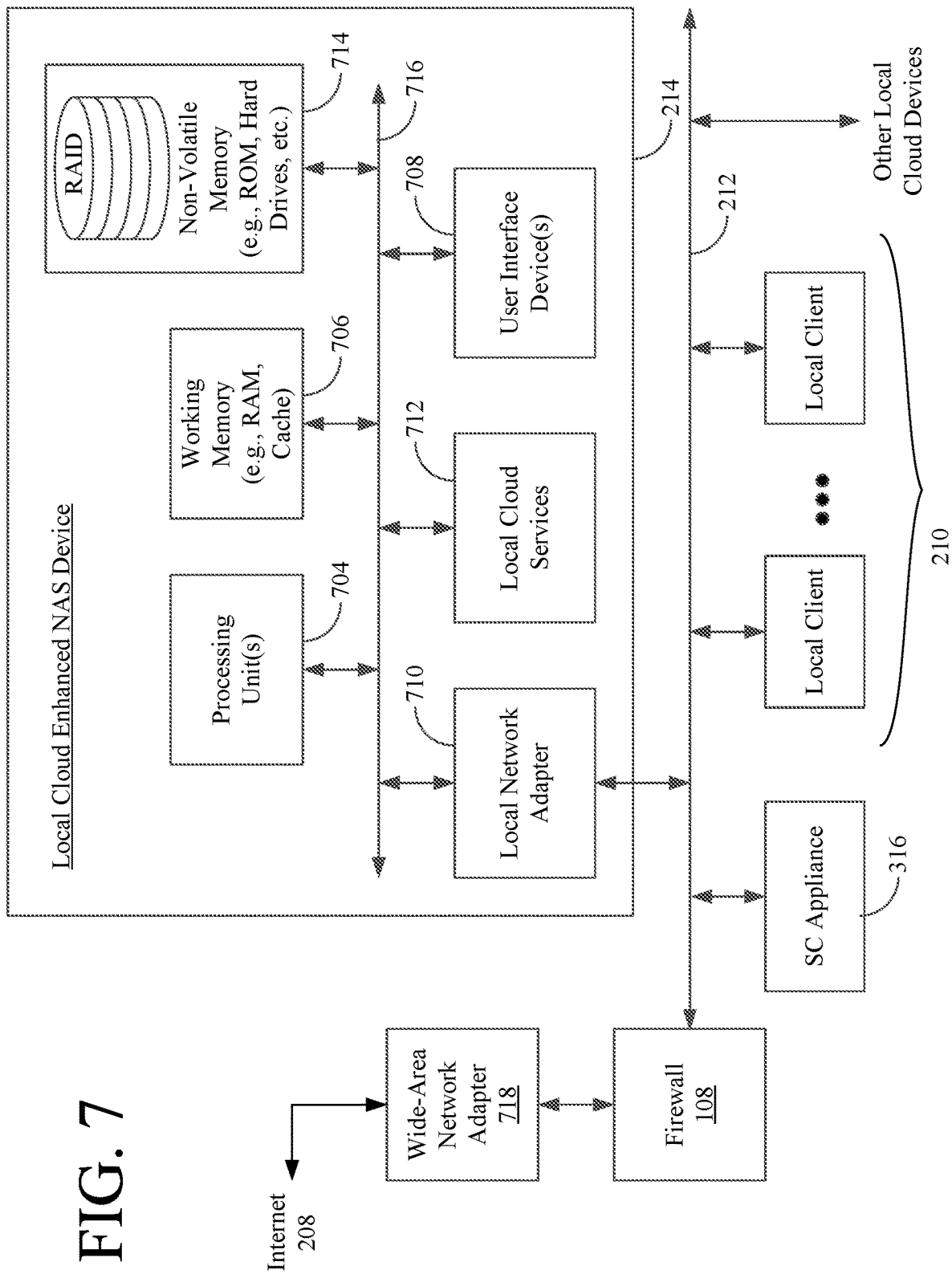
FIG. 7 is a block diagram showing a portion of a local cloud system, including a private storage device, according to the invention.

FIG. 7 is a block diagram showing NAS device 214 of local cloud 104 in greater detail. Device 214 is an enhanced network attached storage (NAS) device that includes one or more processing units 704, working memory 706, one or more user interface devices 708, a local network adapter 710, a local cloud services component 712, and non-volatile memory 714, all intercommunicating via an internal bus 716. Processing units(s) 704 impart functionality to local cloud server 104 by executing code stored in any or all of non-volatile memory 714, working memory 706, and local cloud services 712. Local network adapter 710 facilitates communication with local network 212 and other elements of local cloud 104 (e.g., NAS device 216). A wide-area network adapter 718 facilitates communication between NAS device 214 and the Internet 208. As indicated previously, a firewall 108 is interposed between NAS device 214 (and the other elements of local cloud 104) and WAN adapter 818 for security.

Non-volatile memory 714 provides local file storage for the client file system stored on NAS device 214. By way of example, the nonvolatile memory 714 is shown to include a set of hard drives arranged in a RAID configuration. The client's file system on the RAID drives can be accessed by local clients 210 via local network 212.

Local cloud services 712 represents hardware, software, firmware, or some combination thereof, that provides the functions of NAS device 214 described herein. For example, local cloud services 712 provides local file storage and retrieval services to local users 210. Local cloud services 712 can also interact with SC appliance 316 to permit remote users access to the local file system stored in memory 714.

Figure 8:
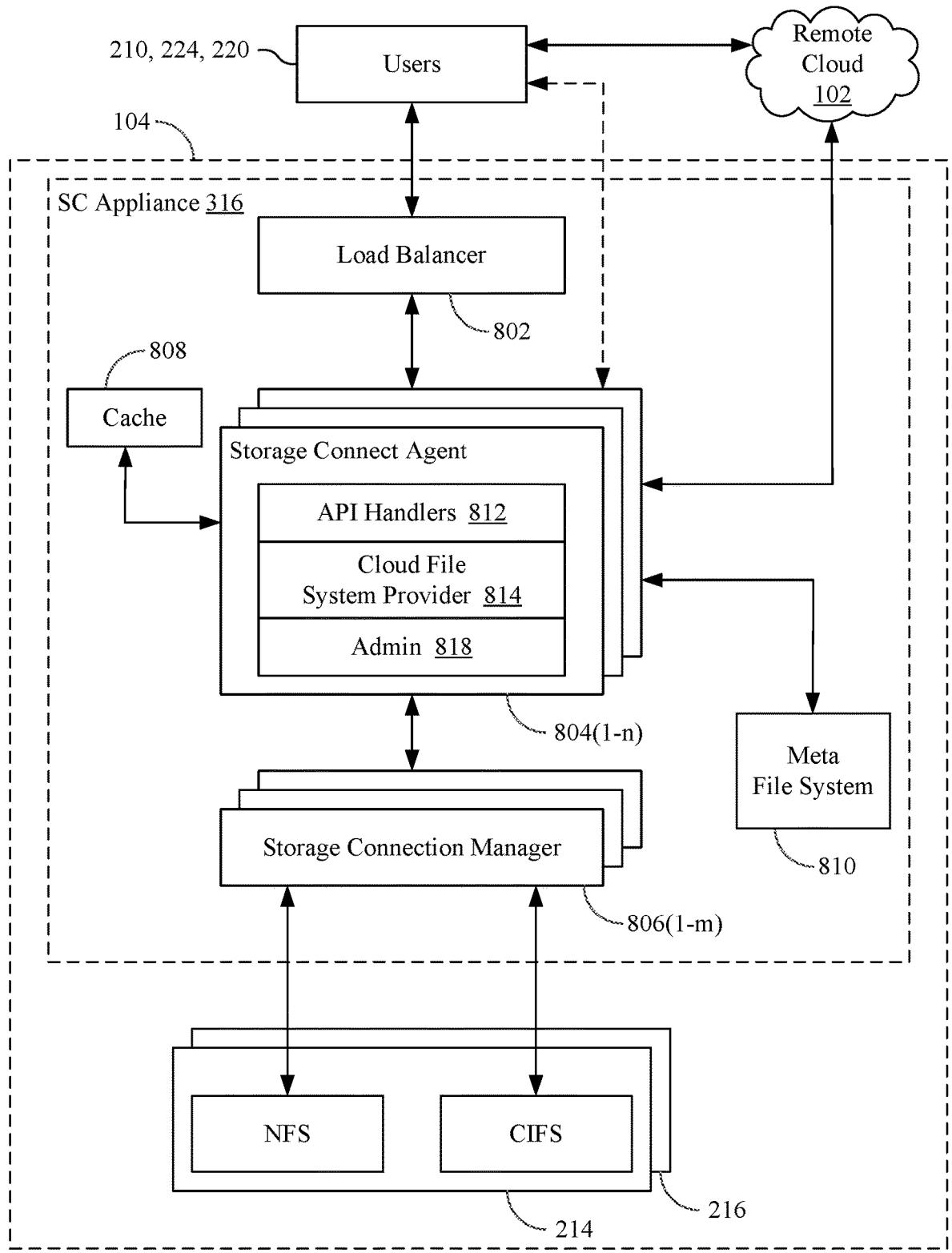
FIG. 8 is a block diagram showing a storage connect appliance of FIG. 3 in greater detail.

FIG. 8 is a block diagram showing SC appliance 316 in greater detail. SC appliance 316 communicates with various users (e.g., local users 210, remote users 224, local users 220 on other client storage devices, etc.) as well as remote cloud 102.

SC appliance 316 includes various service modules including a load balancer 802, a plurality of storage connect (SC) agents 804(1-n), a plurality of storage connection managers 806(1-m), a cache 808, and a meta file system 810. The modules communicate as shown in FIG. 8. Only one communication pathway is shown between plural elements (e.g., SC agents 804(1-n)) and singular elements (e.g., remote cloud 102) for the sake of simplicity. However, it should be understood that multiple communication channels can exist between such single and plural elements (e.g., a separate communication channel can exist between each SC agent 804 and remote cloud 102, etc.). In the present embodiment, SC appliance 316 is implemented on a virtual machine fronting NAS devices 214 and 216. However, SC appliance 316 can be implemented in any combination of software, hardware, and firmware deemed desirable. The modules of SC appliance 316 provide the following functions.

Load balancer 802 receives connection requests from users and distributes those requests across SC agents 804 (1-n) based on the availability and load of the SC agents 804. Accordingly, load balancer 802 balances the cumulative service burden from the users across the pool of SC agents 804. Load balancer 802 also provides SSL termination and performs detection and failover of SC agents 804, thereby ensuring fast and consistent service of the SC agent pool. Load balancer 802 further enables SC Agents 804 to be removed and added smoothly with little to no downtime. In the present embodiment, load balancer 802 acts as a proxy for user communications with SC agents 804(1-n). However, in other embodiments, SC Agents 804 can communicate directly with users after load balancing. Load balancer 802 can be implemented in software (e.g., HAProxy) or in hardware.

Multiple SC agents 804(1-n) are deployed within the virtual machine behind load balancer 802. Multiple SC agents 804(1-n) are deployed for high availability (HA), horizontal scalability, and for no-downtime upgrades. SC agents 804(1-n) delegate all file system operations to the underlying storage (NAS device 214). In a particular embodiment, SC agents 804(1-n) also delegate authentication and authorization of users to the underlying storage device(s), which ensures that local policies are enforced. SC agents 804 also secure communication with remote cloud 102. In the present embodiment, SC Agents use an OAuth token-based mechanism to authenticate and secure communication with the remote cloud 102. Such tokens are configured per SC agent 804 at the time of provisioning.

Each SC agent 804 exposes a set of API handlers 812 that facilitate communication between an SC Agent 804 and each of users and remote cloud 102 and between an SC agent 804 and storage connection managers 806 (1-m). Each SC agent 904 also includes a cloud file system provider 814 that enables local and remote users to perform file system operations on associated remote storage and to securely access content on the underlying private storage, including private (red) datasets. For example, cloud file system provider 814 extends access for local user 210 to the unified client namespace 100 via communication with remote cloud 102. Additionally, cloud file system provider 814 enables a remote user 224 to securely access the underlying private storage.

SC agents 804(1-n) also include administration 818, which allows users and system administrators to monitor the health of the agents 804(1-n) (e.g., duty cycles, availability, etc.) and to manage various other functions of the agents 804. Administration 818 also permits an SC agent 804 to communicate with, for example, an administration console of IT personnel associated with the client. IT personnel can thereby establish various cloud parameters for files and folders stored on NAS devices 214 and 216. For example, administration 818 facilitates identifying objects in the file system that are to be accessed remotely and further identifying which of those objects will be private (red) files 112 and which files will be synchronized files 114(A). Administration 818 also facilitates providing connection information associated with local cloud 104 (e.g., IP Address, port, etc.) and red namespace pointer information for each red namespace to remote cloud 102 for associating with client namespace 100. Administration 818 also facilitates setting client caching policies and replication policies files and folders. These and other functions of administration 818 will be apparent in view of this disclosure.

SC agents 804(1-n) also access a cache 808. Cache 808 can be a distributed cache, which is accessible to multiple SC agents 804(1-n). In the present embodiment, cache 808 can be implemented using Memcached. Cache 808 speeds up SC agents 804(1-n) by storing frequently used information, alleviating repetitive file system and database calls, etc. Cache 808 can operate on different caching policies as determined by the client and set by IT. Cache 808 can also be used to indicate to other SC agents 804 that particular file system objects are being accessed and, therefore, might be in a state of flux.

Additionally, SC Agents 804(1-n) interact with a meta file system 810. Meta file system 810 is created to store objects such as metadata associated with shared objects, metadata annotations such as comments, audit events in transit to remote cloud 102, hyperlink metadata, and user-session information. Meta file system 810 can be implemented as a partition on a reliable data store, such as in working memory 806 and/or memory 814.

Storage connection managers 806(1-m) proxy traffic between SC agents 804(1-n) and the underlying storage. Storage connection managers 806(1-m) are implemented as separate multi-threaded processes allowing for better virtual machine (VM) resource utilization, protection against memory leaks in native libraries, and scaling with the underlying storage.

FIGS. 9A-9F show exemplary data structures for cloud metadata 310 associated with a client namespace 100. Cloud metadata 310 is a collection of information about a client and objects within that client's distributed file system. Cloud metadata 310 is used to generate a virtual representation of client namespace 100 that can be presented to users associated with the client. Cloud metadata 310 also facilitates remote access to red file systems located on private client storage.

Figure 9A:
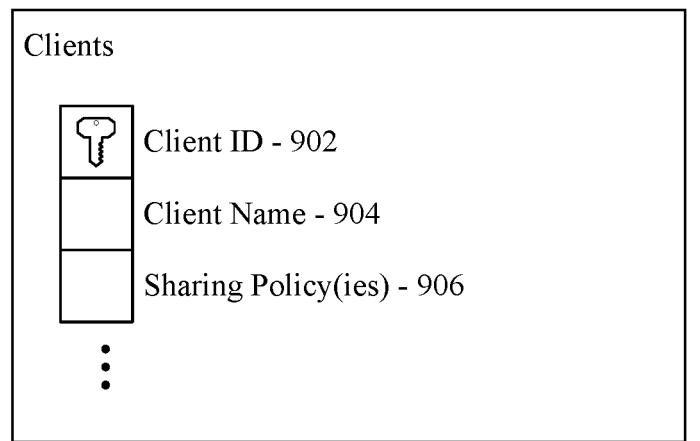
FIG. 9A is a data structure showing a clients table in accordance with the invention.

FIG. 9A shows an exemplary client table 900 that includes information about a particular client. Each record in table 900 includes a client ID field 902, a client name field 904, and a sharing policy ID field 906. Client ID field 902 is the key field for the client record and includes data uniquely identifying a client. Client name field 904 includes the name of the client identified in field 902. Sharing policy ID field(s) 906 includes data associating the client with a cloud sharing policy. Table 900 can include other information about the client as desired.

Figure 9B:
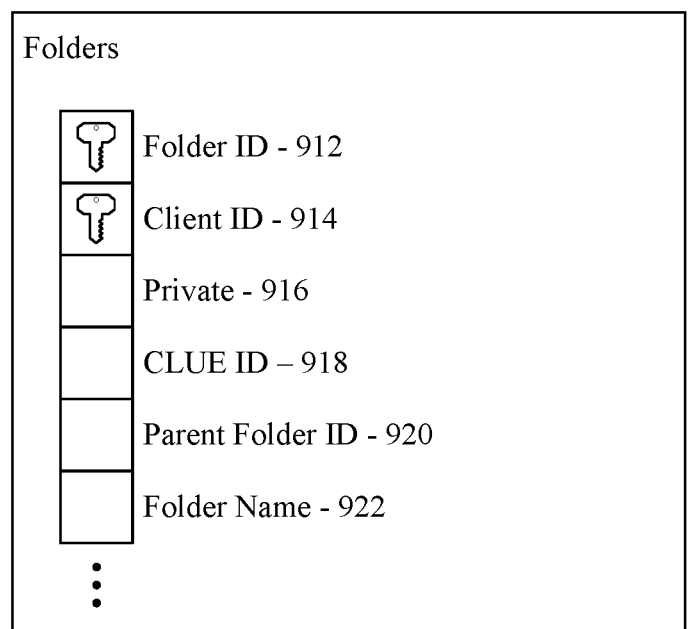
FIG. 9B is a data structure showing a folders table in accordance with the invention.

FIG. 9B shows an exemplary folders table 900 that includes information associated with a folder object or a red node in client namespace 100 for the client. Each record in folders table 900 includes a folder ID field 912, a client ID field 914, a private field 916, a CLUE ID field 918, a parent folder ID field 920, and a folder name field 922. Folder ID field 912 includes data uniquely identifying a folder record. Client ID field 914 includes data corresponding to a client identifier 902 in table 900. Together, fields 912 and 914 uniquely identify a folder record. Private field 916 includes data (e.g., a flag, etc.) indicating if the folder record is associated with private (red) file system object. In other words, private field 916 includes data indicating if the folder object is a red node in client file system 100. CLUE ID field 918 associates the folder record with a Cloud Location Unique Entry (CLUE) record in cloud metadata 310. As will be discussed below, the associated CLUE record will include information facilitating access to a red namespace portion on a private storage system associated with the client. Parent folder ID field 920 includes a folder identifier identifying the parent folder record of the current folder record. Folder name field 922 includes data indicating the name of the folder associated with the folder record. For a red node, folder name field 922 will contain the name of the associated red namespace pointer (150-155). Folders table can include additional fields as desired. If a folder record is associated with a red node (e.g., red nodes 140-148), the information contained in the record will likely be minimal to maintain confidentiality. There are likely to be many folder records associated with a client.

Figure 9C:
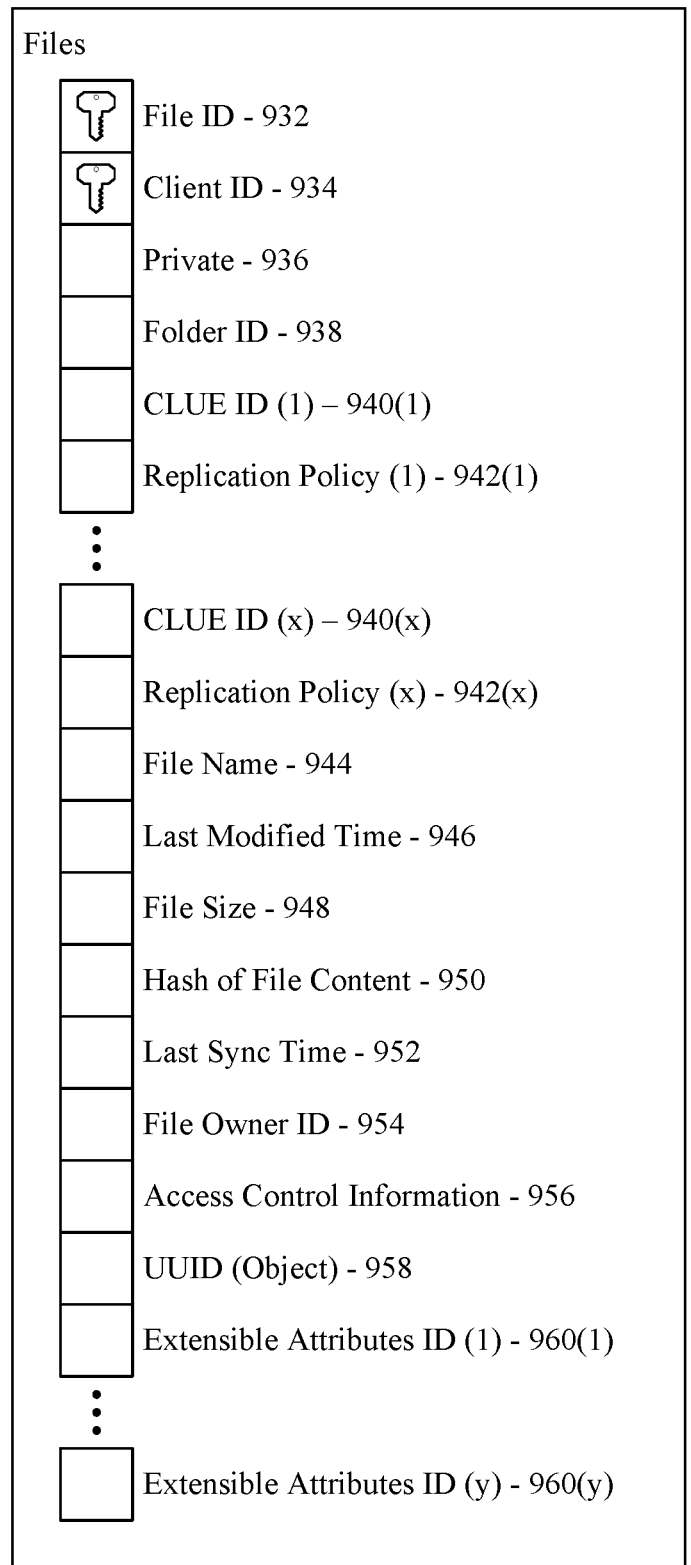
FIG. 9C is a data structure showing a files table in accordance with the invention.

FIG. 9C shows an exemplary file table 930 that includes information associated with a file object in client namespace 100. Each file record in table 930 can include a file ID field 932, a client file ID field 934, a private field 936, a folder ID field 938, a first CLUE ID field 940(1), a first replication policy field 942(1), a last CLUE ID field 940(x), and a last replication policy field 942(x). Each record in table 930 can also includes a file name field 944, a last modified time field 946, a file size field 948, a hash of file content field 950, a last sync time field 952, a file owner field 954, an access control information field 956, a UUID field 958, and one or more extendible attribute ID fields 958(1-x). There are likely to be many file records associated with a client.

File ID field 932 contains data identifying the file record, and client ID field 934 identifies a client record in table 900 that the file record is associated with. Together these fields uniquely identify the file record and associate with client namespace 100. Private field 936 includes data (e.g., a flag) indicating if the associated file is a private (red) file. Folder ID field 938 include a folder identifier identifying the folder that the file is located in. Each of Clue ID fields 940(1-x) associates the file record with a particular CLUE record. The list of CLUE ID fields 940 (1-x) indicates all the locations in the hybrid cloud system 200 that contain data or metadata for the file associated with the file record. Replication policy fields 942(1-x) include data defining a replication policy for the associated file at each of the hybrid cloud locations represented by CLUE ID fields 940(1-x).

File name field 944 stores the file name of the associated file. Last modified time field 946 stores information indicating the last time the associated file was modified (field used for files stored on remote cloud 102). File size field 948 includes data indicating the size of the associated file (field used for files stored on remote cloud 102). Hash of file content field 950 contains hash information for the associated file (field used for files stored on remote cloud 102). Last sync time field 952 includes data indicating the last time the associated file was synchronized with remote locations (field used for files stored on remote cloud 102). File owner field 954 includes information associated with the files owner. Access control information field 956 includes data defining users and groups that can access the file. UUID field 958 includes a unique identifier associating the file record with an object record stored in the objects database of the Object Store Services Layer of FIG. 6. Extensible attribute fields 960(1-y) associate the file record with extensible attribute records (discussed below).

The various fields of the file record will be substantially filled for green and yellow files, which are stored on the cloud. However, for private red files only some of the fields (e.g., fields 932-940(1) and 944) are filled to maintain the confidentiality of the associated file. In the case of a red file, the private field 936 would be set. Folder ID field 938 could be used to determine the location of the red node associated with the private file in the client namespace 100. CLUE ID field 940(1) would contain information indicating the private data store containing the associated file and how to access that file in that data store. File name field 944 would contain data providing a representation for the red namespace pointer in client namespace 100, but the file name field 944 need not contain the actual name of the file. Instead, file name field 944 could contain a non-descript identifier determined by administrators of the private data store.

For green and yellow files stored on remote cloud 102, fields 946-952 facilitate determining when the file's metadata and/or data should be synced to other locations (e.g., the locations identified in some of CLUE ID fields 940(1-x)). Replication policy fields 942(1-x) indicate whether and how a file should be replicated to the locations associated with CLUE ID fields 940(1-x). The CLUE ID fields 940(1-x) and replication policy fields 942(1-x) form a list of tuples, where each tuple contains a site identifier and a replication option that applies to data going to that site. The replication options include replicate data and metadata; replicate data only, do not replicate metadata; replicate metadata only; move the data, leaving behind only the metadata, or do not sync anything. Thus, client metadata 310 can be used to implement custom replication policies for client across hybrid cloud storage system 200 for each file.

Figure 9D:
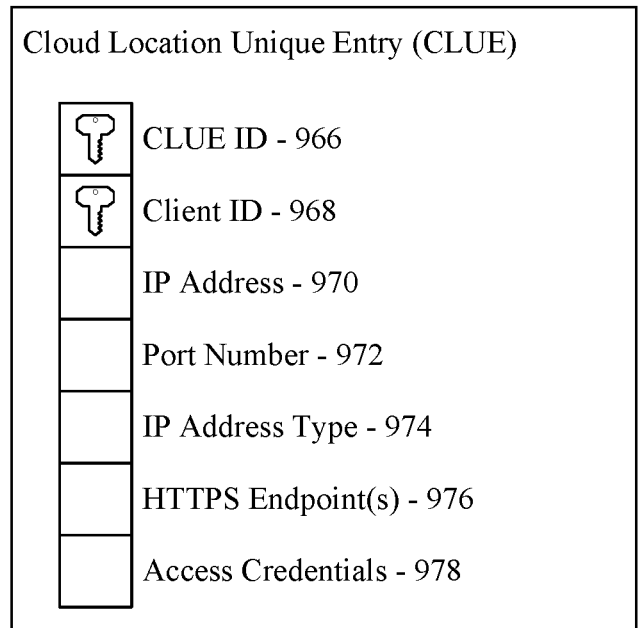
FIG. 9D is a data structure showing a CLUE table in accordance with the invention.

FIG. 9D shows an exemplary Cloud Location Unique Entry (CLUE) table 964. Each CLUE record in table 964 includes a CLUE ID field 966, a client ID field 968, an IP address field 970, a port number field 972, an IP address type field 974, an HTTPS endpoints field 976, and an access credentials field 978. CLUE ID field 966 includes information uniquely identifying the associated CLUE record. Client ID field 968 includes data associating the CLUE record with a client record of table 900. Together, fields 966 and 968 uniquely identify a CLUE record. A client can be associated with many CLUE records.

IP address field 970 includes IP address information for the storage location (e.g., remote cloud 102, local cloud 104, local cloud 106, etc.) within hybrid cloud storage system 200 identified by the CLUE record. Port number field 972 includes data identifying a communications port number at the associated storage location. IP address type field 974 contains information indicating the IP address type (e.g., IPv4 or IPv6). HTTPS endpoint(s) field 976 includes HTTPS endpoint(s) for the resource associated with the CLUE. In the case of local clouds 104 and 106, HTTPS endpoint(s) field 976 could include connection information for SC appliances 316 and 317, respectively, and information to access an associated red namespace portion of the private file system. Access credentials field 978 includes data representing access credentials for the associated storage location.

CLUE ID records provide location information and/or access information that can be used to locate and access resources within hybrid cloud storage system 200. For example, CLUE's can serve as red namespace pointers for red nodes within client namespace 100. CLUES also are used to access storage locations storing different copies of client files (client metadata and/or data) within hybrid cloud storage system.

Figure 9E:
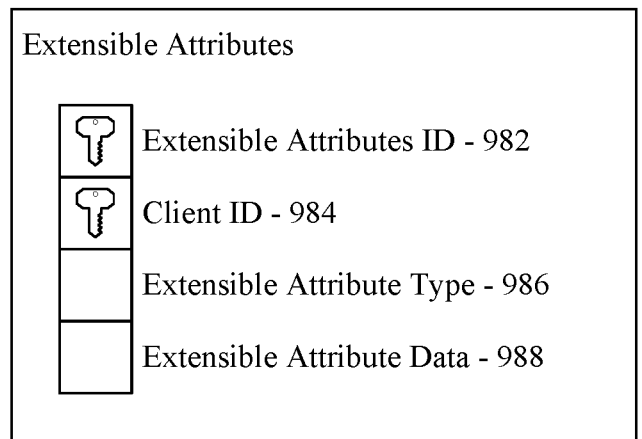
FIG. 9E is a data structure showing an extensible attributes table in accordance with the invention.

FIG. 9E shows an exemplary extensible attributes table 980. Each record in table 980 includes an extensible attributes ID field 982, a client ID field 984, an extensible attribute type field 986, and an extensible attribute data field 988. Extensible attribute ID field 982 includes data identifying an extensible attribute record, and client ID field 984 includes data associating the extensible attributes record with a client in table 900. Together, fields 982 and 984 uniquely identify each extensible attribute record. Extensible attribute type field 986 includes an indicator identifying the type of extensible attribute (e.g., search tags, third-party attribute blob, etc.) Extensible attribute data field 988 stores attribute data or a pointer to the attribute data. The attribute data could be the actual search tags or a pointer to attribute blobs.

Extensible attributes provide advantages. For example, search tags that are associated with a file can be replicated to various metadata locations in hybrid cloud storage system in order facilitate efficient search of content in the files. The search tags can be computed at sites where the data is present, and replicated as part of the metadata. File searches can then be percolated to different sites. Attribute blobs can also be copied verbatim and replicated to remote sites. Remote cloud 102 serves as a transport mechanism for attribute blobs, but does not attempt to interpret them. Attribute blobs could be an access control list (ACL) or meta information produced by 3rd party products (e.g. virus scanners, deduplication systems, etc.) that allow these applications to provide value added services for these files.

Figure 9F:
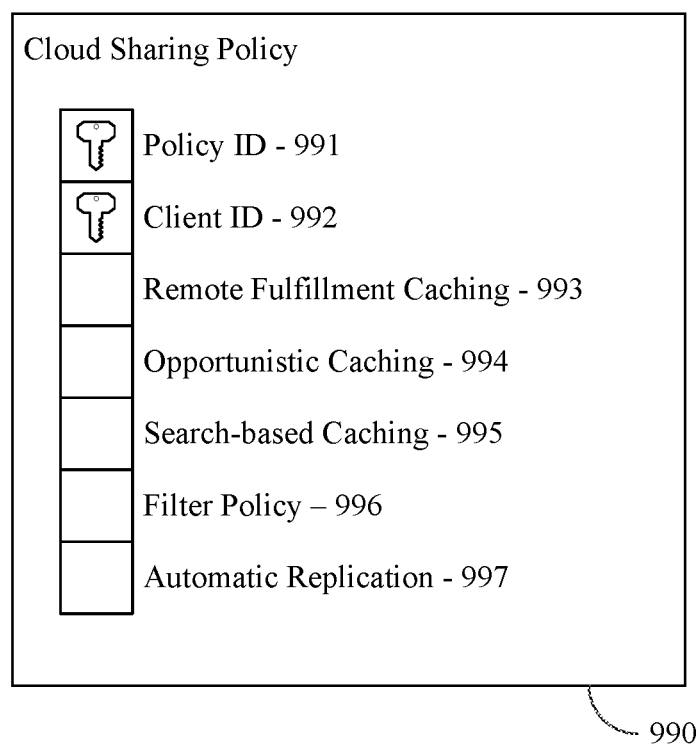
FIG. 9F is a data structure showing a sharing policy table in accordance with the invention.

FIG. 9F shows an exemplary cloud sharing policy table 990 that associates one or more cloud sharing policies with a client. Each record in cloud sharing policy table 990 includes a policy ID field 991, a client ID field 992, remote fulfillment caching field 993, opportunistic caching field 994, search-based caching field 995, filtering policy field 996, and automatic replication field 997. Policy ID field 991 contains data identifying each policy record, and client ID field associates each policy record with a client. Together, fields 991 and 992 uniquely identify each policy record.

Fields 993-997 contain information if the associated client wants to implement a particular cloud sharing policy for the client's network. Field 993 contains data indicating whether the client wants to implement a caching policy that caches any file at a cloud or ELC if the request was 'filled' by a remote site. Field 994 contains data indicating whether the client wants to implement an opportunistic caching policy which would cache all files in the same directory as the requested file when a data or metadata request is filled by a remote site. Field 995 contains data indicating whether the client wants to implement a search-based-caching policy that causes the top popular files that match the most often repeated search queries to be cached. Field 996 contains data indicating whether the client wants to implement a filter policy, which prevents any files that match a particular content type, extension, or search tag from being replicated. Field 997 contains data indicating whether the client wants to implement an automatic replication policy that automatically replicates metadata and data for files that match a search tag, extension type, modified date, etc. to a replication site. This is useful for data retention to meet HIPAA and Sarbanes Oxley policies. Indeed, various cloud sharing policies are possible. Additionally, different policies could be set up for particular locations in the client's hybrid storage system 200. Additionally, different policies could be associated with each of the red, yellow, and green file use cases.

A first embodiment of the invention has now been described where cloud storage/service and on-premise storage infrastructures work in concert facilitate access to client namespace 100 without placing private client files (data or client metadata) on the remote cloud 102. Aspects of the present invention provide file access, sharing and mobility to end users, while allowing IT to hold client data 100% on-premises if desired. Files can reside on local storage and be managed by IT for the use cases that require data to stay private. Whether a client is meeting compliance needs or wants to expose legacy file shares without moving them to the cloud, embodiments of the present invention provide private-cloud security with some or all of the benefits of public cloud.

Certain advantages of the present invention are provided by separating the logic for user access (Control plane) from the actual storage (Storage plane). Access can still be managed from remote cloud 102 while keeping data purely on-premises. Users can work against the private storage as if they were in the office, reviewing, uploading and sharing files. If desired, no red files need pass through the cloud, ensuring compliance with clients' business needs.

Users can access files from any location using any personal computer or a range of smart phones and tablets. Native mobile apps enable users to access and share files from popular mobile platforms. Users can browse the private storage, download and upload files on the private storage as if the files were hosted in the cloud. Users can also share files by sending a secure link to the files. Links can be managed using expiration rules and passwords.

Files can be stored on any common internet file system (CIFS) or network file system (NFS) share hosted on any storage device behind the corporate firewall. Whether a user has commodity storage, Windows file shares or Tier 1 platforms like NetApp, IBM or EMC, the present invention can integrate seamlessly with that storage platform.

The present invention provides the first Enterprise File Sharing Platform. Users get the access, sharing and mobility to/of files through a single view (unified namespace) regardless of where the files reside. IT can choose to locate files in the cloud, purely on-premises, or hybrid (cloud+On-premises) based on the use case and risk profile of the files (Green, Yellow, Red) without hosting and managing complex software in-house. With the present invention, IT no longer has to choose between security and convenience or between public and private cloud solutions. The present invention provides one integrated platform that delivers everything IT and users need to seamlessly integrate the worlds of public cloud, on-premises storage, and private cloud.

Figure 10A:
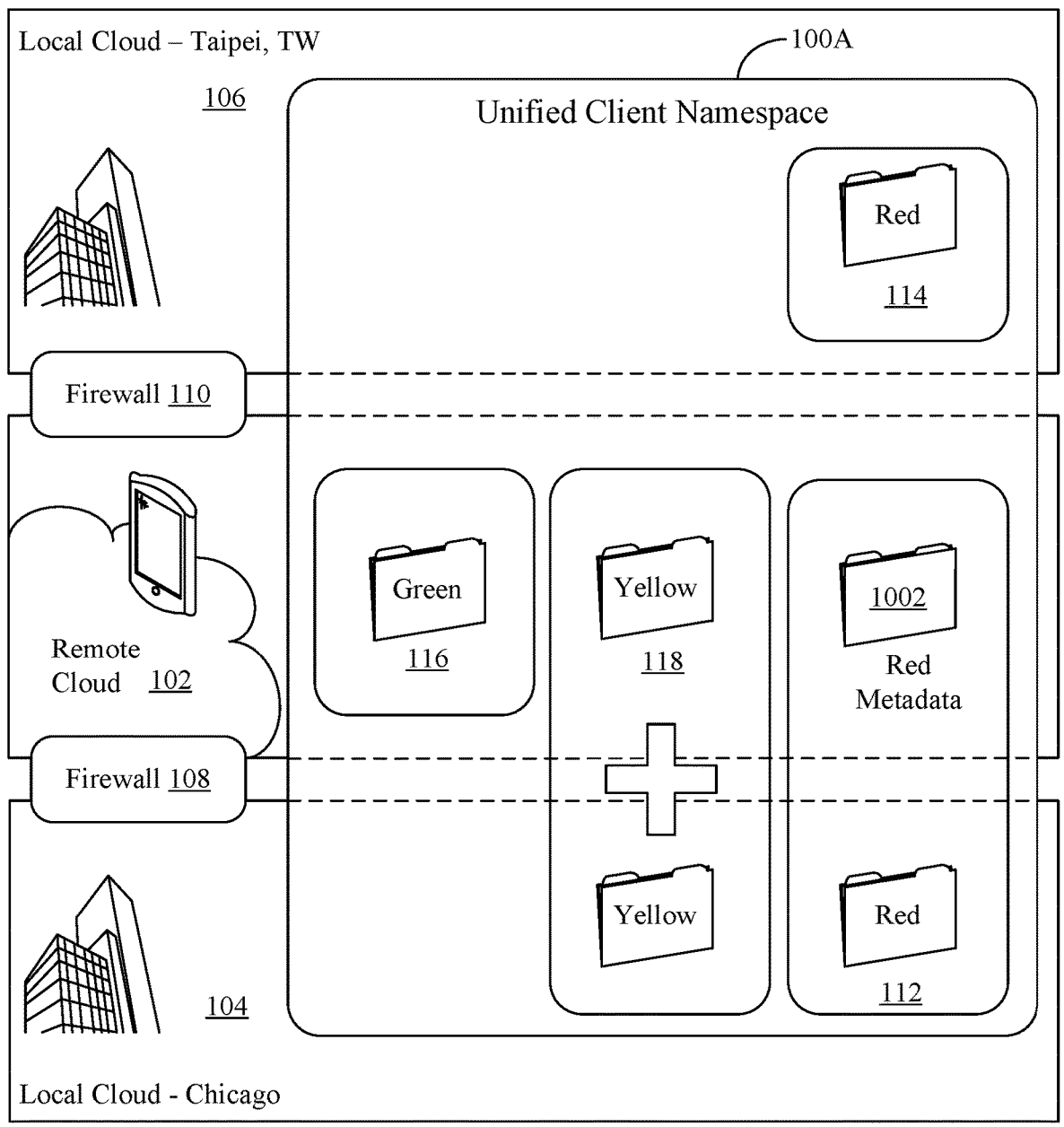
FIG. 10A shows an alternative unified client namespace according to the invention.
Figure 10B:
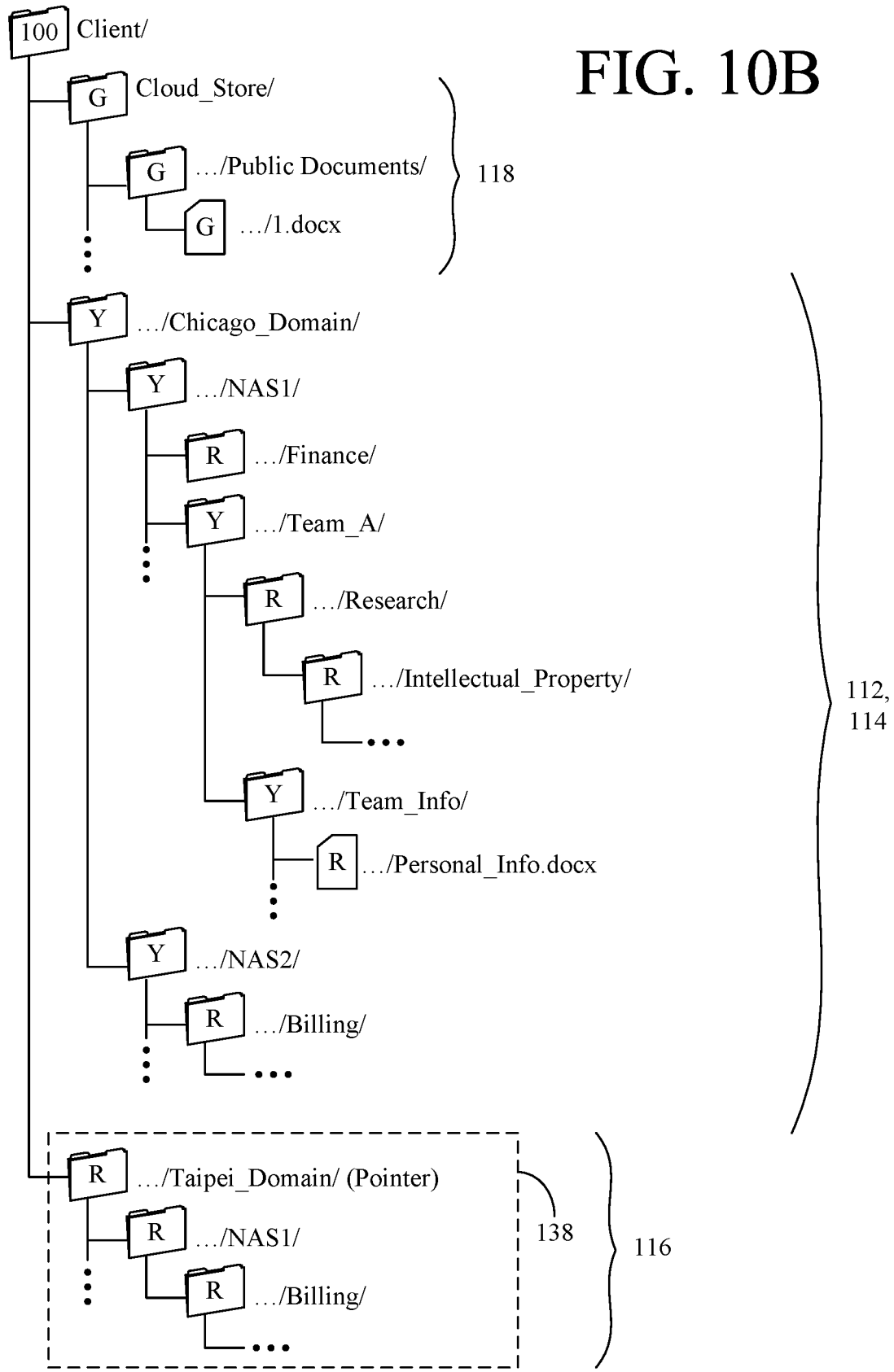
FIG. 10B also shows the unified client namespace of FIG. 10A.

FIG. 10A illustrates a unified client namespace 100A according to an alternative embodiment of the present invention. Client namespace 100A aggregates the same files systems therein as client namespace 100 shown in FIG. 1A, except that in FIG. 100A, the client metadata 1002 associated with private (red) file system 112 has been synchronized with remote cloud 102 and associated cloud metadata 310 has been generated. Therefore, as shown in FIG. 10B, remote cloud 102 can provide the entire red namespace associated with red file system 112 to users accessing remote cloud 102 without redirecting users to a client storage system to access the red namespace portion, as would still be the case with red file system 114 on local cloud 106. Despite the metadata 1002 being synchronized with remote cloud 102, the actual red data files remain behind firewall 108.

The method illustrated in FIGS. 10A-10B allows red metadata to be resident in the remote cloud 102 for browsing and navigating by red folders and filenames. When a user requests access to a red file, the cloud metadata 310 will provide a CLUE to the user, where the CLUE points to the SC appliance 316 behind firewall 108 that can be queried for the red file.

The embodiment described in FIGS. 10A-10B is also advantageous because the remote cloud 102 can augment cloud metadata 310 with search tags for each file in red file system 112, allowing search of the core of the client namespace 100 to be performed at the remote cloud level. Other file operations normally done locally (e.g., access control, etc.) could also be done at the cloud level, thereby relieving these processing burdens from the local clouds. When a user finds a red file of interest, and requests access to the red file, remote cloud 102 will lookup the CLUE list for that file and trigger a 'get request' (e.g., over HTTP) to one or more of the private storage locations that has access to the requested data. The cloud may choose to cache the 'transiting' data for faster service to future requests or, for security reasons, may choose to not keep any cached copies of the data. This is a user configurable setting as discussed previously.

Figure 11:
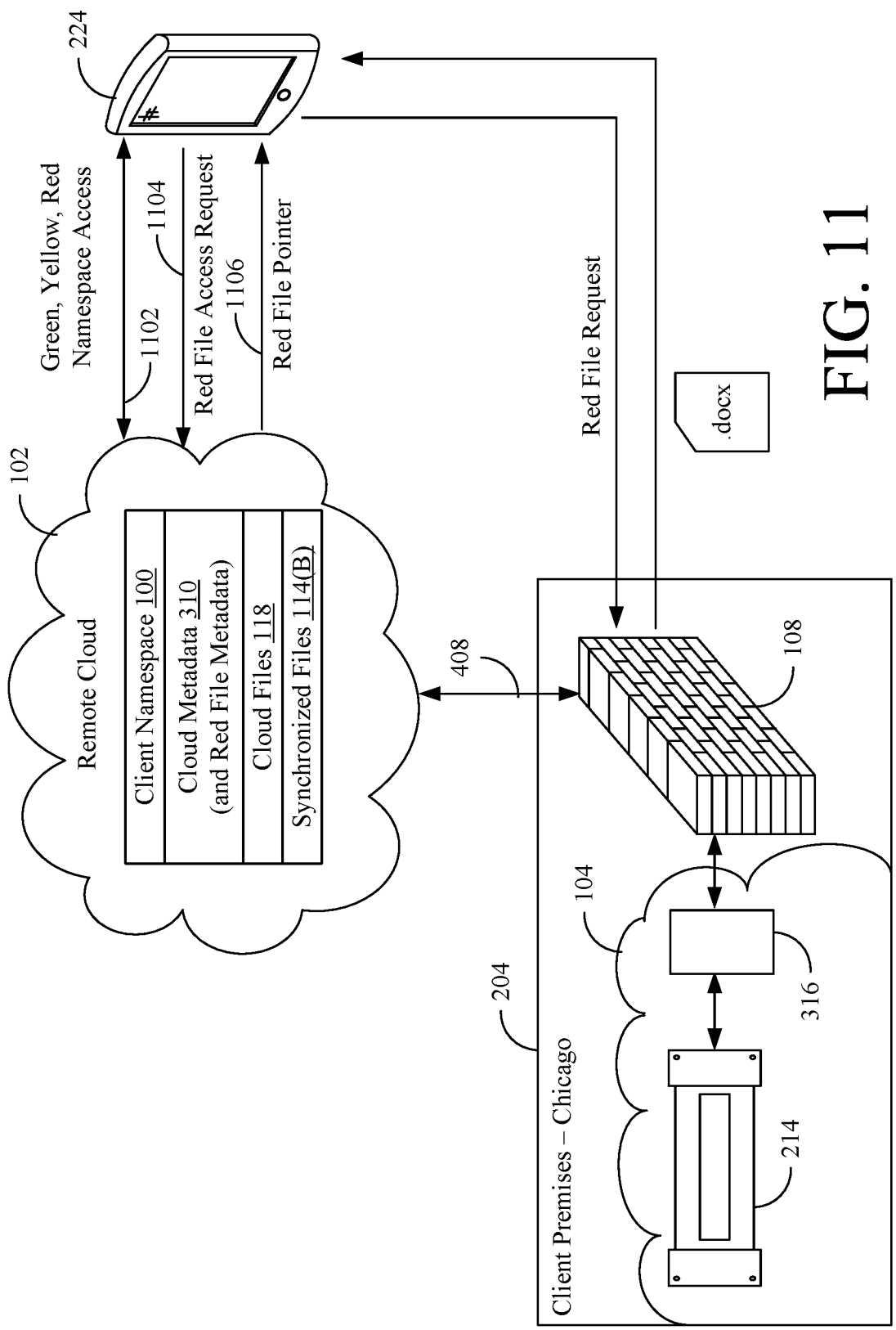
FIG. 11 shows a method for providing access to files according to the invention.

FIG. 11 shows an embodiment that is similar to FIG. 4B, but in FIG. 11 remote cloud 102 includes client metadata 1002. Accordingly, when remote user 224 establishes a connection 1102 with remote cloud 102, remote cloud provides remote user 224 with access to client namespace 100A, including the red namespaces associated with red file system 112. Remote user 224 can, therefore, browse red file system 112 without being connected to local cloud 204. Subsequently, remote user 224 can request 1104 access to a red file in red file system 112. In response, remote cloud 102 will provide 1106 a red file pointer to remote user 224, which remote user 224 can use to connect to local cloud 104 and obtain the requested red file.

Figure 12A:
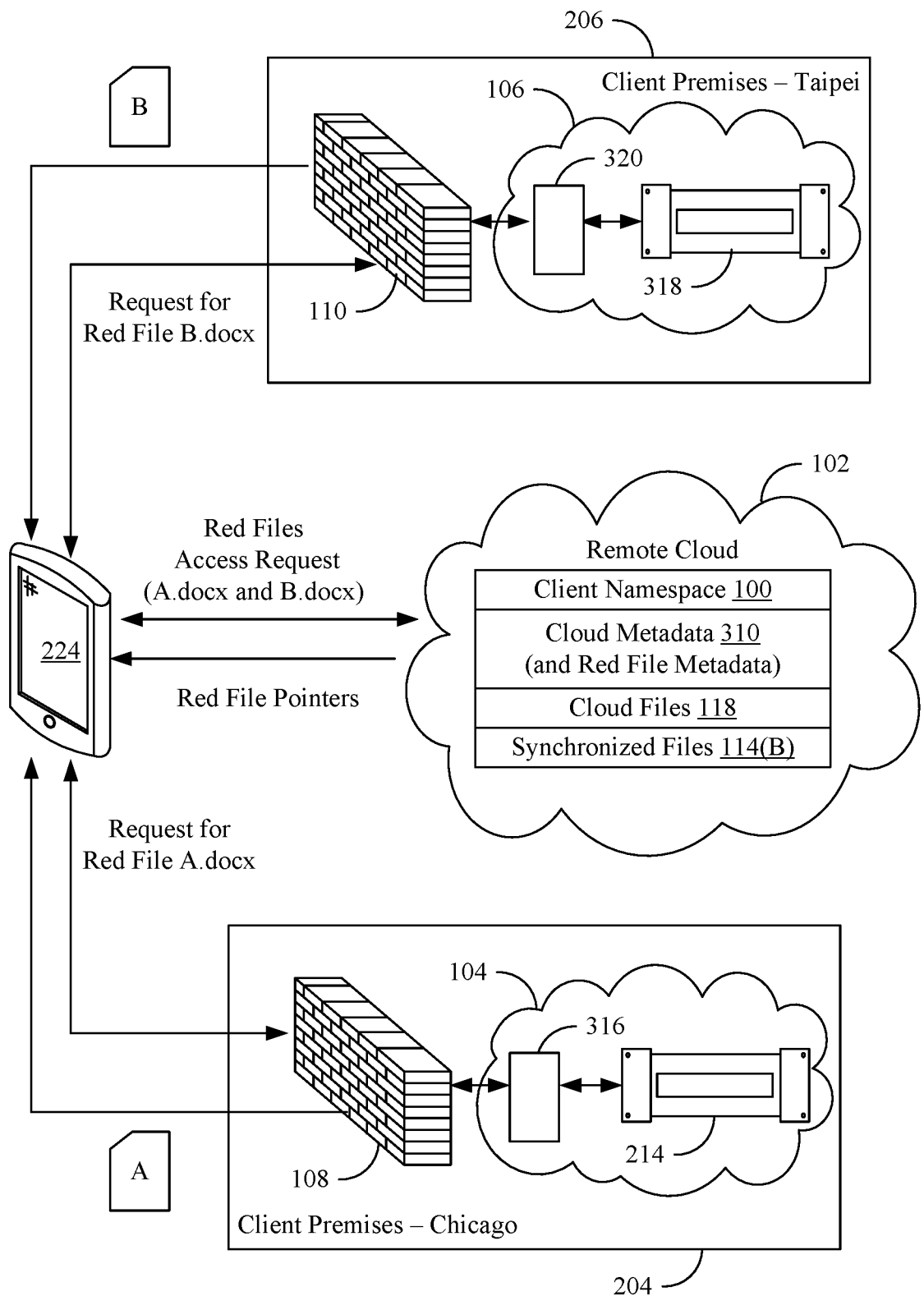
FIG. 12A shows another method for providing access to files according to the invention.
Figure 12B:
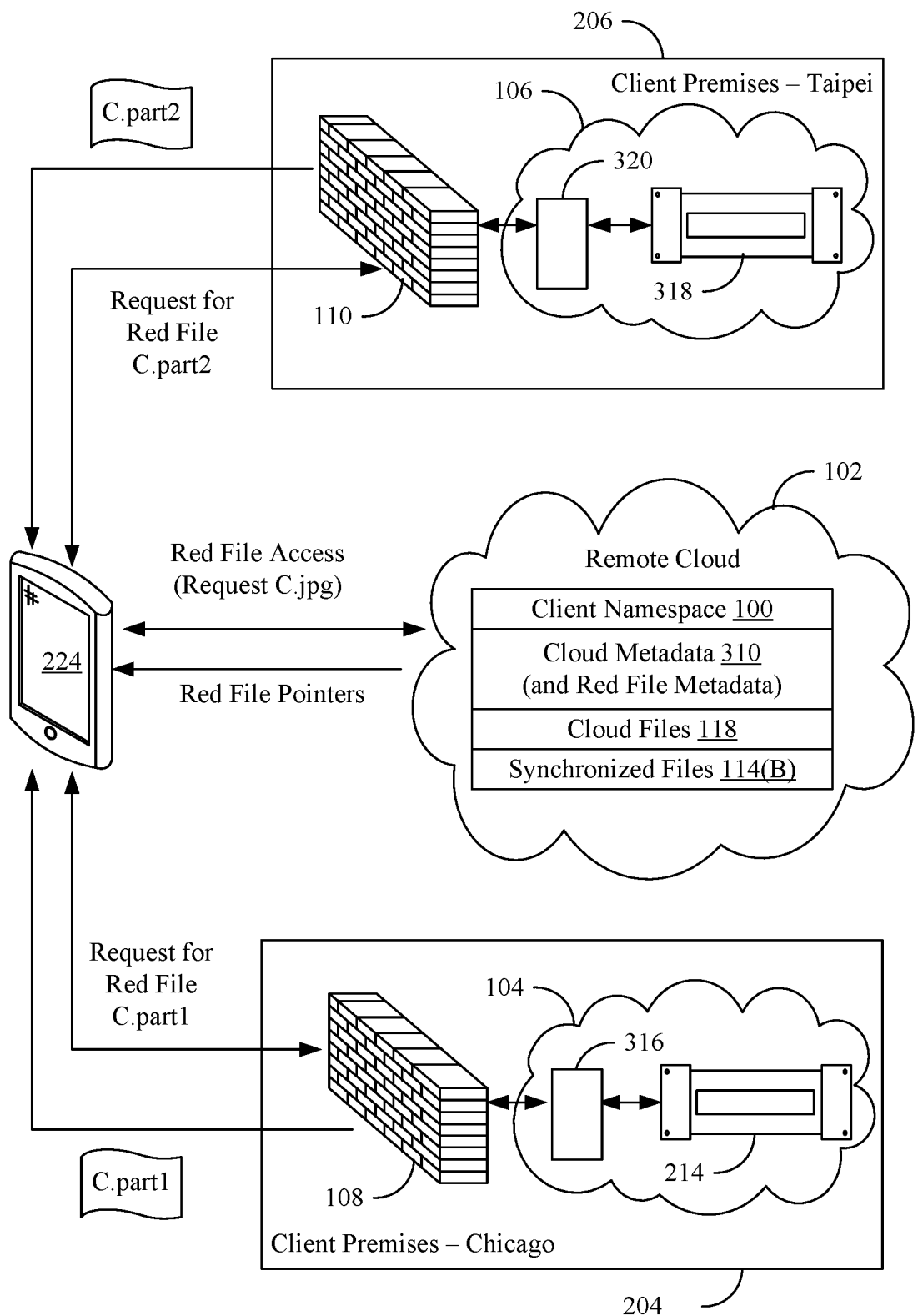
FIG. 12B shows another method for providing access to files according to the invention.

FIGS. 12A-12B illustrate two ways that storing red-file metadata in remote cloud 102 can accelerate remote access for mobile user 224. While these methods are described with respect to mobile user 224, the same methods can be used to accelerate file access for any user (e.g., local users 210, local users 220, etc.) of hybrid cloud system 200. The embodiments shown in FIGS. 12A-12B further assume that red file metadata associated with the red file system 116 has also been provided to remote cloud 102.

One feature of hybrid cloud system 200 is that a file may be replicated at multiple client sites in the distributed file system. Remote sites typically have slower WAN network links. Hence, retrieving a file, or a set of files, from a single location becomes a serial activity. If location information is captured as part of the cloud metadata for each location on which a file is stored, retrieving one or more files can be sped up by one or more of the following methods:

(a) Retrieve different files from different locations, thereby, making multi-file retrieval a parallel operation; and (b) Retrieve different parts of the same file from different locations and re-assembling the final file together at the file destination. This makes retrieval of individual file pieces from remote sites (i.e. an 'upload' from remote sites) a parallel operation.

The above methods are of particular benefit to red files, but can improve access to yellow and green files as well.

FIG. 12A illustrates case (a) above. In FIG. 12A, a remote user 224 has requested both "A.docx" and "B.docx", which are private files. Cloud metadata 310 indicates that A.docx is stored on at least local cloud 104 and B.docx is stored on at least local cloud 106. Accordingly, remote cloud 102 provides red file pointers for A.docx and B.docx, respectively, to remote user 224. Remote user 224, in turn, uses the red file pointers to retrieve A.docx and B.docx in parallel from local cloud 104 and local cloud 106, respectively.

FIG. 12B illustrates case (b). In FIG. 12B, a remote user 224 has requested "C.jpg", which cloud metadata 310 indicates is a file stored on both of local clouds 104 and 106. Accordingly, remote cloud 102 provides red file pointers for C.jpg for each of local clouds 104 and 106 to remote user 224. Remote user 224, in turn, uses the red file pointers to retrieve different parts of C.jpg in parallel from local cloud 104 and local cloud 106, respectively When remote user 224 receives those parts, remote user 224 reassembles C.jpg. Thus, portions of C.jpg are retrieved in parallel, such that C.jpg can be accessed quickly. This method is helpful for large files.

Figure 13:
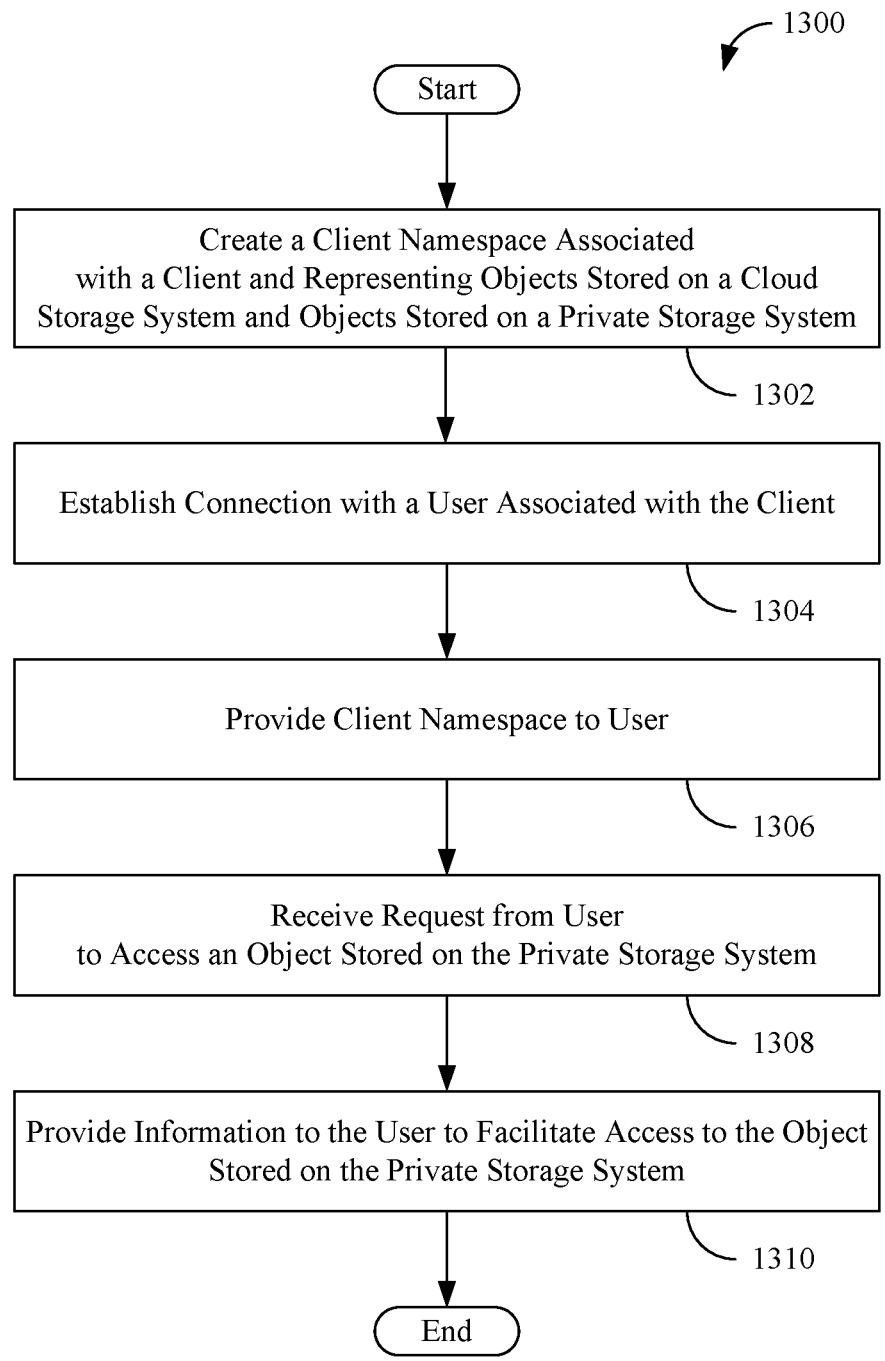
FIG. 13 is a flow chart summarizing a method for providing access to objects in a distributed file system according to the present invention.

FIG. 13 is a flow chart summarizing one method 1300 for providing access to objects in a distributed file system associated with a particular client. In a first step 1302, a client namespace is created that represents objects stored on a cloud storage system and objects stored on a private storage system. Then, in a second step 1304, a connection is established with a user associated with the client. Next, in a third step 1306, the client namespace is provided to the user. Then, in a fourth step 1308, a request to access an object stored on the private storage system is received from the user. Next, in a fifth step 1310, information that facilitates access to the object stored on the private storage system is provided to the user.

Figure 14:
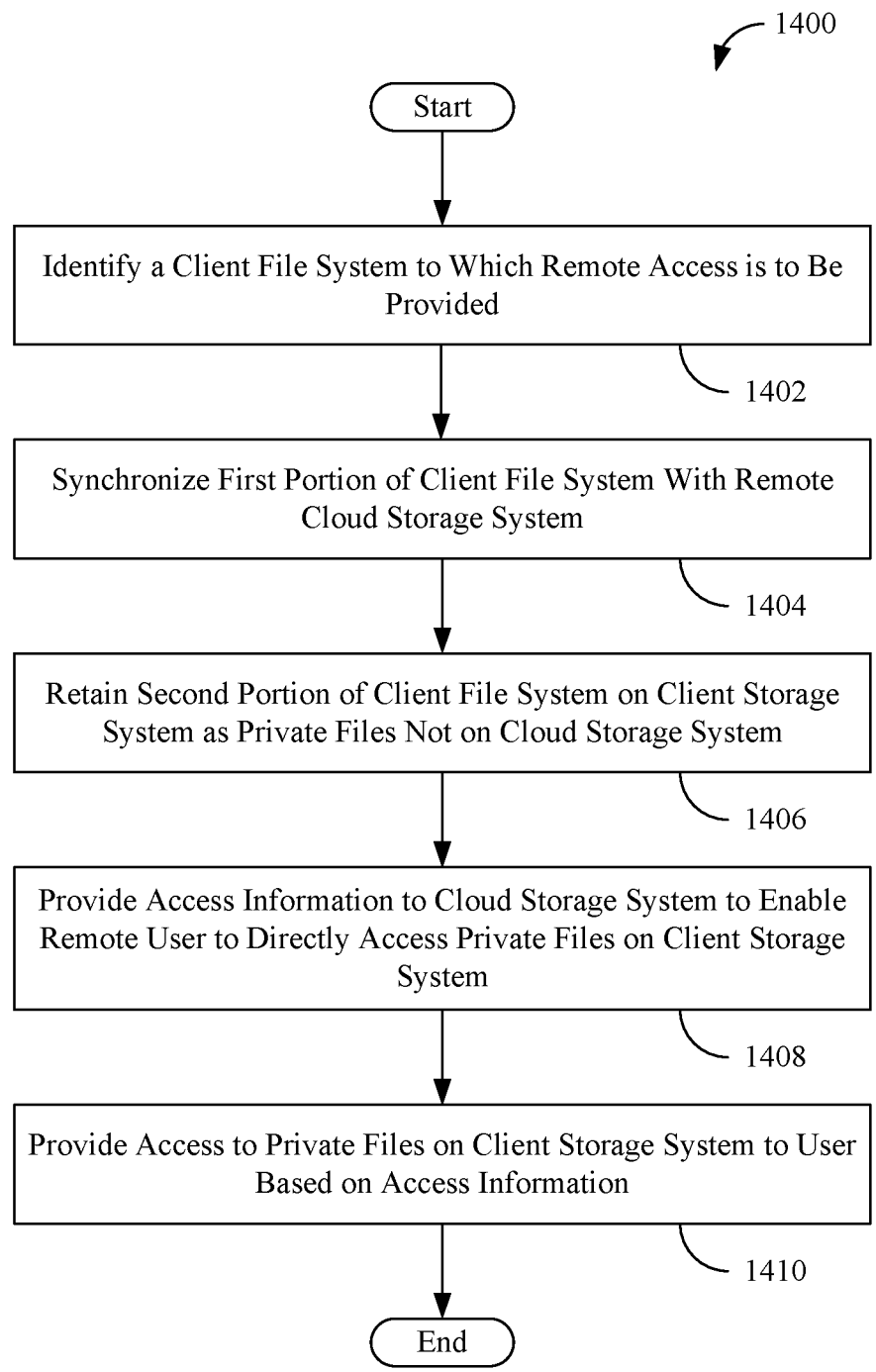
FIG. 14 is a flowchart summarizing another method for providing access to objects.

FIG. 14 is a flowchart summarizing another method 1400 for providing access to objects associated with a particular client. In a first step 1402, a client file system to which remote access is to be provided is identified. Then, in a second step 1404, a first portion of the client file system is synchronized with a remote cloud storage system. Next, in a third step 1406, a second portion of the client file system is retained on the client storage system as private files that are not placed on the cloud storage system. Then, in a fourth step 1408, access information that enables a remote user to directly access private files on the client storage system is provided to the cloud storage system. Finally, in a fifth step 1410, access to the private files on the client storage system is provided to the user based on the access information provided to the user by the cloud file storage system.

Figure 15:
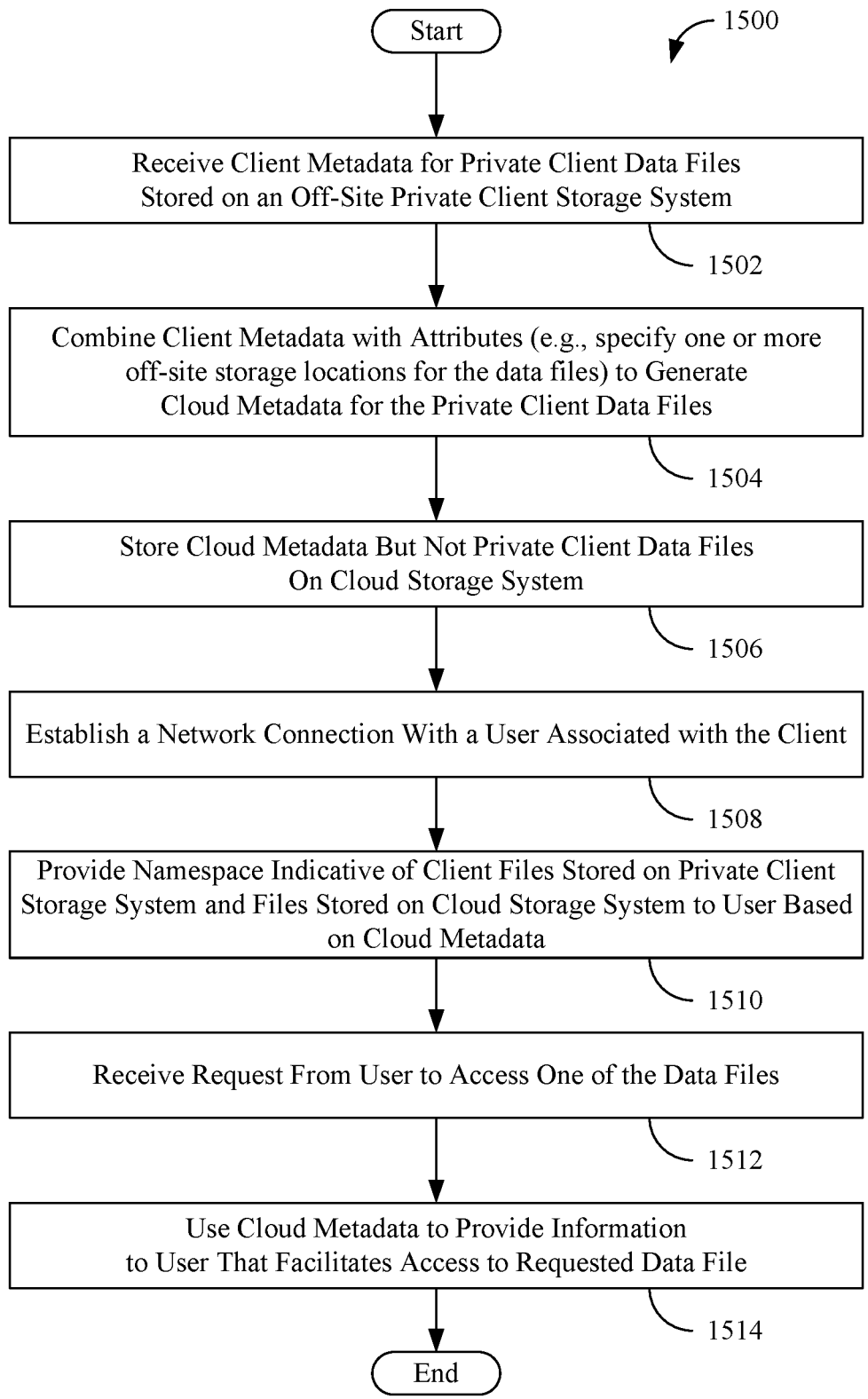
FIG. 15 is a flowchart summarizing a method for providing access to files via a cloud storage system.

FIG. 15 is a flowchart summarizing a method 1500 for providing access to files via a cloud storage system. In a first step 1502, client metadata associated with private client data files stored on a private off-site client data storage system is received. Then, in a second step 1504, the client metadata is combined with attributes to generate cloud metadata for the private client data files. By way of non-limiting example, the attributes can specify one or more off-site storage locations where the data files reside. Next, in a third step 1506, the cloud metadata, but not the private client data files, is stored on the cloud storage system. Then, in a fourth step 1508, a network connection is established with a user associated with the client. Next, in a fifth step 1510, a namespace indicative of both the client files stored on the private client storage system and the files stored on the cloud storage system is provided to the user based on the cloud metadata. Then, in a sixth step 1512, a request from the user to access one of the data files is received, and, in a seventh step 1514, the cloud metadata is used to provide information to the user that facilitates access to the requested data file.

Figure 16:
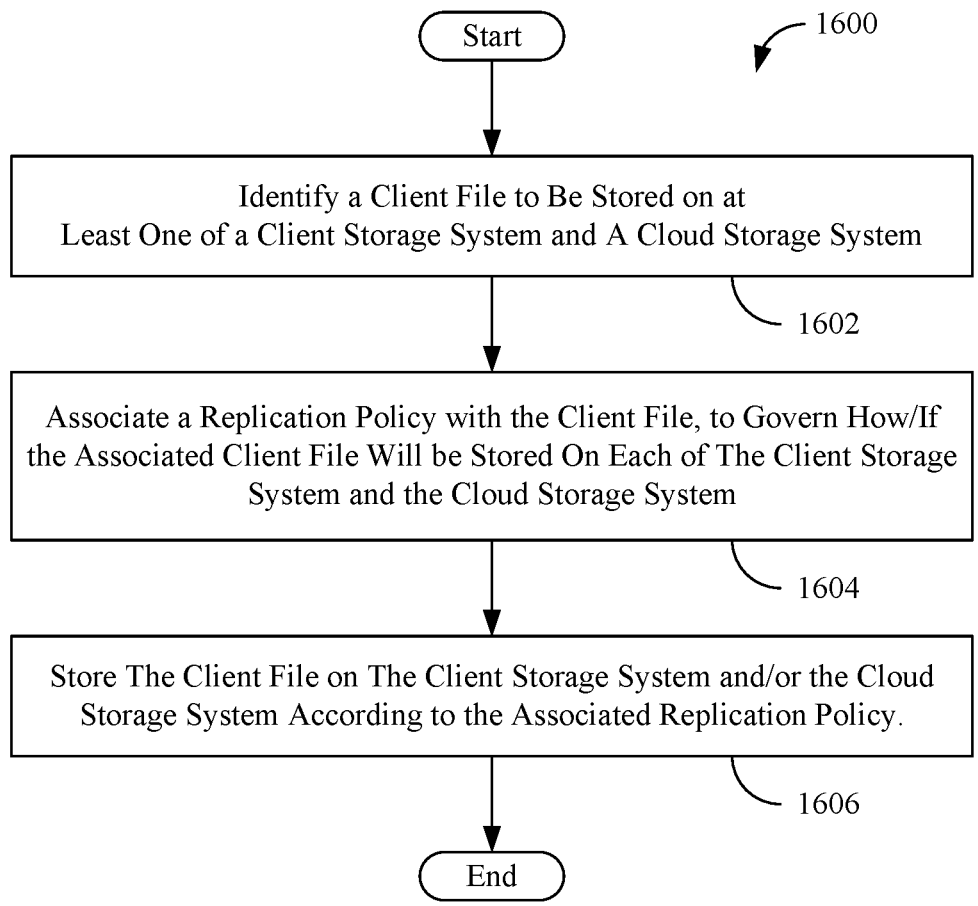
FIG. 16 is a flowchart summarizing one method of replicating files associated with a client.

FIG. 16 is a flowchart summarizing one method 1600 of replicating files associated with a client. In a first step 1602, a client file to be stored on a client storage system and/or a cloud storage system is identified. Next, in a second step 1604, a replication policy is associated with the identified client file. The replication policy determines how/if the associated client files will be stored on each of the client storage system and the cloud storage system. For example, the client file may be stored on the client storage system only, the cloud storage system only, or both the client storage system and the cloud storage system. Then, in a third step 1606, the client file is stored on the client storage system and/or the cloud storage system according to the associated replication policy.

Figure 17:
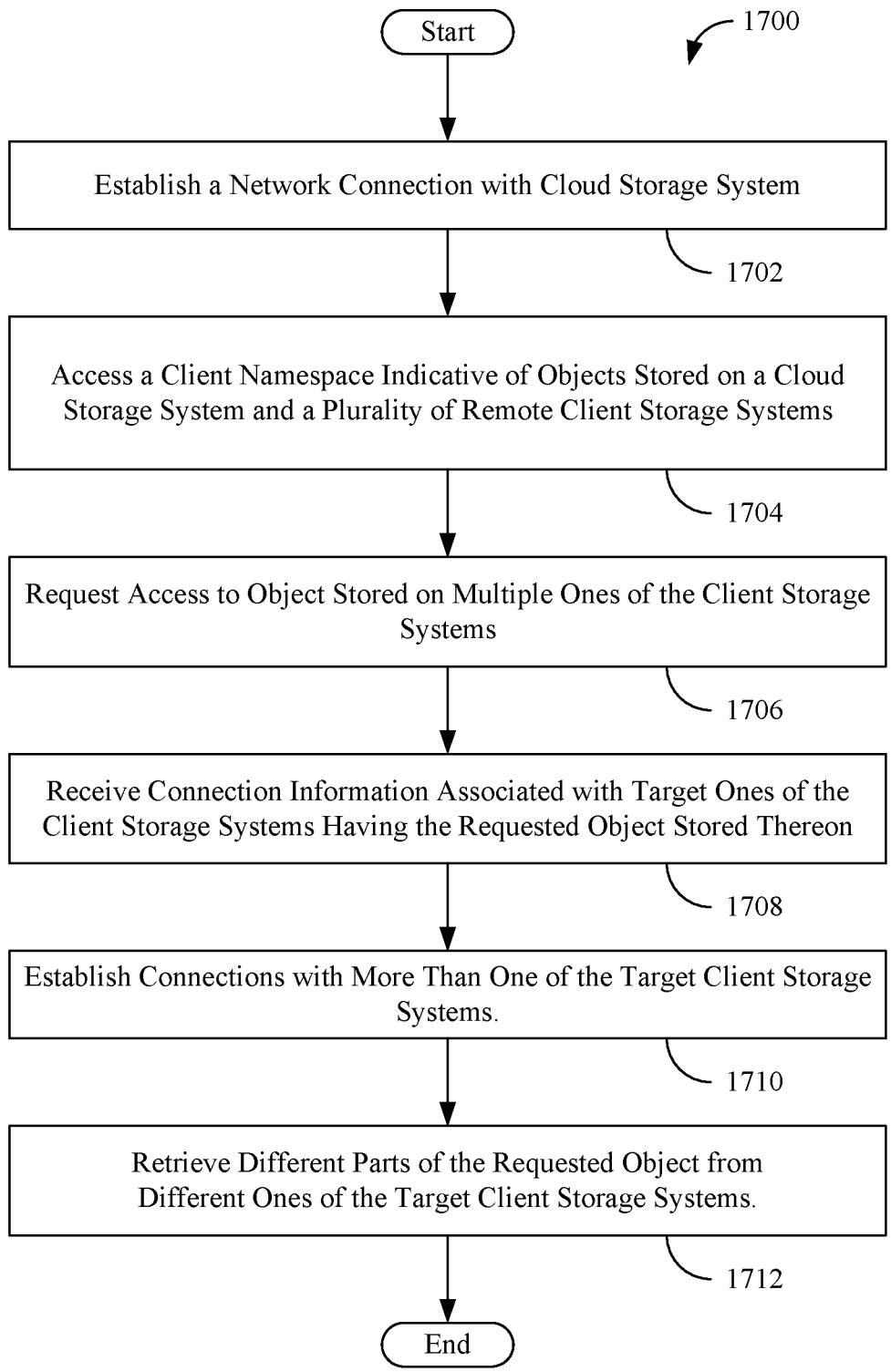
FIG. 17 is a flowchart summarizing a method for accessing files/objects in a distributed file system.

FIG. 17 is a flowchart summarizing a method 1700 for accessing files/objects in a distributed file system associated with a client. In a first step 1702, a connection is established with a cloud storage system. Next, in a second step 1704, a namespace associated with the client is accessed via said cloud storage system. The namespace is indicative of a plurality of client files stored on the cloud storage system and stored on a plurality of client storage systems apart from said cloud storage system. Then, in a third step 1706, access to a file stored on multiple ones of the client storage systems is requested. Next, in a fourth step 1708, connection information associated with target ones of the client storage systems having the requested file stored thereon is received. Then, in a fifth step 1710, connections with more than one of the target client storage systems are established, and, in a sixth step 1712, different parts of the requested file are received from different ones of the target client storage systems.

Figure 18:
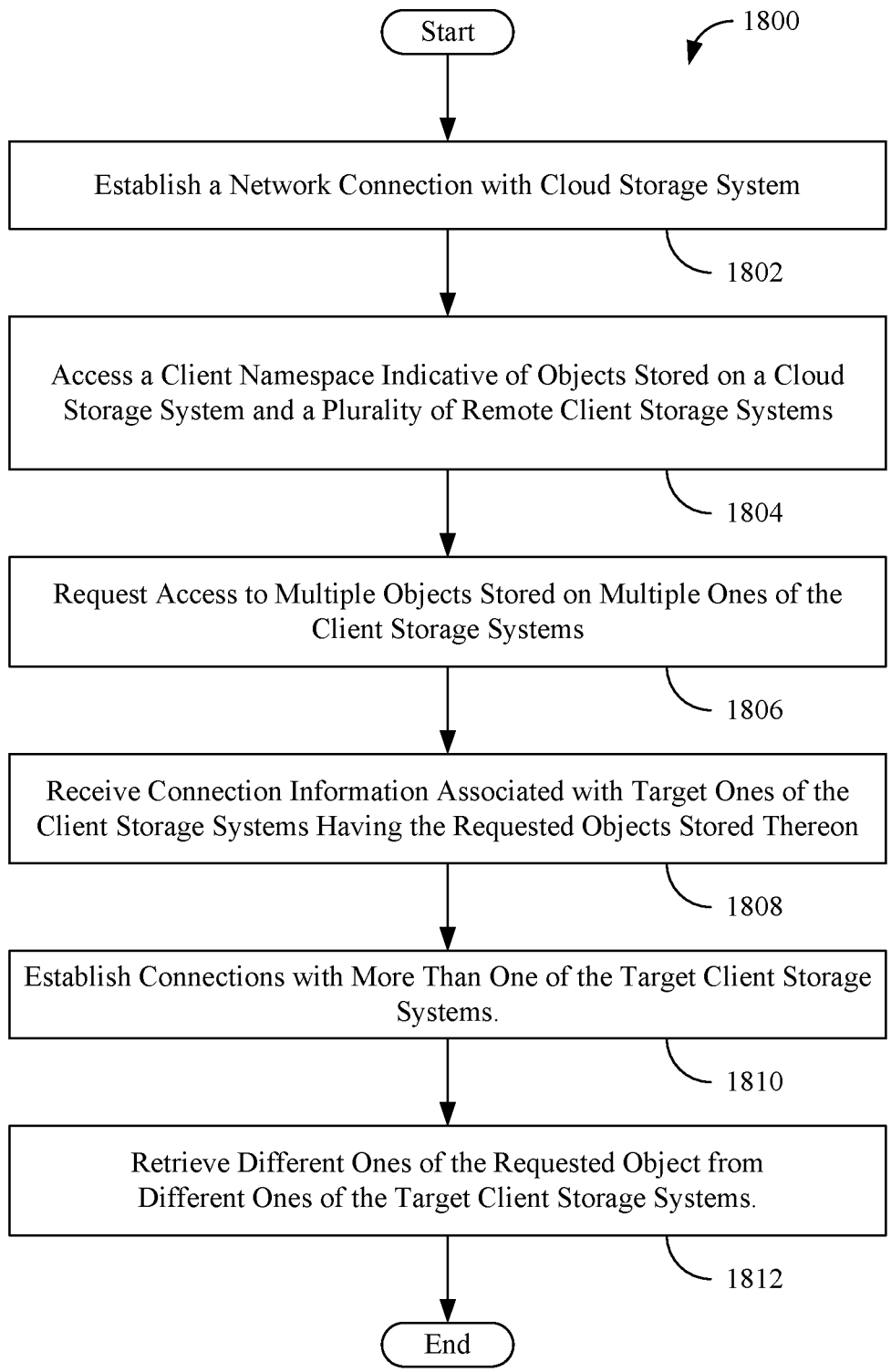
FIG. 18 is a flowchart summarizing another method for accessing files/objects in a distributed file system associated with a client.

FIG. 18 is a flowchart summarizing another method 1800 for accessing files/objects in a distributed file system associated with a client. In a first step 1802, a connection is established with a cloud storage system. Next, in a second step 1804, a namespace associated with the client is accessed via said cloud storage system. The namespace is indicative of a plurality of client files stored on the cloud storage system and stored on a plurality of remote client storage systems apart from said cloud storage system. Then, in a third step 1806, access to multiple files stored on multiple ones of the client storage systems is requested. Next, in a fourth step 1808, connection information associated with target ones of the client storage systems having the requested files stored thereon is received. Then, in a fifth step 1810, connections with more than one of the target client storage systems are established, and, in a sixth step 1812, different ones of the requested files are received from different ones of the target client storage systems.

The description of particular embodiments of the present invention is now complete. Many of the described features may be substituted, altered or omitted without departing from the scope of the invention. For example, different cloud metadata structures can be substituted for the ones shown. As another example, the hybrid cloud storage system associated with the client can include more local clouds and/or more remote clouds. As still another example, an enhanced network attached storage device can provide the functions of the SC appliances described herein. These and other deviations from the particular embodiments shown will be apparent to those skilled in the art, particularly in view of the foregoing disclosure.

We claim:

1. A method for providing access to private data objects via a distributed file storage system, said method comprising:

storing metadata associated with said private data objects on a first file storage system of said distributed file storage system;

storing said private data objects on a second file storage system of said distributed file storage system but not said first file storage system, said second file storage system being located remotely from said first file storage system;

establishing a connection between a user and said first file storage system;

using said metadata to facilitate the selection of one of said private data objects by a user, said user being located remotely from said first file storage system and said second file storage system; and enabling said user to access said selected private data object; and wherein said step of enabling said user to access said selected private data object includes providing said user with access information associated with said selected private data object;

said access information includes information enabling said user to establish a connection with said second file storage system;

said access information includes information enabling said user to access said selected private data object via said connection with said second file storage system;

said access information includes information enabling said user to send a request to generate a hyperlink to said second file storage system via said connection with said second file storage system; and said request to generate said hyperlink causes said second file storage system to generate said hyperlink and transmit said hyperlink to a second user, said second user being located remotely from said first file storage system and said second file storage system.

2. The method of claim 1, wherein said access information includes HTTPS endpoint information.

3. The method of claim 1, wherein said step of enabling said user to access said selected private data object includes:
locating said access information associated with said selected private data object;
using at least a portion of said access information to establish a connection between said first file storage system and said second file storage system;
using at least a portion of said access information to allow said first file storage system to access said selected private data object via said connection between said first file storage system and said second file storage system; and
providing said user with access to said selected private data object via said connection between said user and said first file storage system.

4. The method of claim 3, wherein said access information includes HTTPS endpoint information.

5. The method of claim 1, wherein:
said user is a local user co-located with a third file storage system; and
said step of enabling said user to access said selected private data object includes providing said third file storage system with access information associated with said selected private data object, said access information at least partially enabling said third file storage system to establish a connection with said second file storage system and to access said selected private data object.

6. The method of claim 5, wherein said access information includes HTTPS endpoint information.

7. The method of claim 1, wherein said step of using said metadata to facilitate the selection of one of said private data objects by said user includes providing a namespace associated with at least a portion of said private data objects to said user.

8. The method of claim 1, wherein said second file storage system generates said hyperlink and transmits said hyperlink to said second user responsive to receiving said request.

9. The method of claim 1, wherein said first user is located geographically remotely from said second user.

10. A distributed file storage system server for providing access to private data objects not stored on said server, said server comprising:
at least one processing unit;
a first storage device adapted to store metadata associated with said private data objects, but not said private data objects;
a storage interface configured to communicate with a second storage device remote from said first storage device, said second storage device adapted to store said private data objects and to provide said metadata to said first storage device; and
a user interface operative to
establish a connection with a user located remotely with respect to said first storage device and said second storage device,
use said metadata to facilitate the selection of one of said private data objects by said user, and
enable said user to access said selected private data object; and wherein
said user interface is operative to provide said user with access information associated with said selected private data object;
said access information includes information enabling said user to establish a connection with said second storage device;
said access information includes information enabling said user to access said selected private data object via said connection with said second storage device;
said access information includes information enabling said user to send a request to generate a hyperlink to said second storage device via said connection with said second storage device; and
said request to generate said hyperlink causes said second storage device to generate said hyperlink and transmit said hyperlink to a second user, said second user being located remotely from said first storage device and said second storage device.

11. The system of claim 10, wherein said access information includes HTTPS endpoint information.

12. The system of claim 10, wherein:
said metadata includes said access information associated with said selected private data object;
said storage interface is operative to utilize at least a portion of said access information to establish a connection with said second storage device;
said storage interface is operative to access said selected private data object via said connection with said second storage device; and
said user interface provides said user with access to said selected private data object via said connection with said user.

13. The system of claim 12, wherein said access information includes HTTPS endpoint information.

14. The system of claim 10, wherein:
said user is a local user co-located with a third storage device; and
said storage interface is configured to provide said third storage device with access information associated with said selected private data object, said access information at least partially enabling said third storage device to establish a connection with said second storage device and to access said selected private data object.

15. The system of claim 14, wherein said access information includes HTTPS endpoint information.

16. The system of claim 10, wherein said user interface is operative to provide said user with a private namespace associated with at least a portion of said private data objects.

17. The system of claim 10, wherein said second storage device generates said hyperlink and transmits said hyperlink to said second user responsive to receiving said request.

18. The method of claim 10, wherein said first user is located geographically remotely from said second user.

19. A non-transitory, electronically-readable storage medium having code embodied therein for causing an electronic device to perform a method for providing access to files via a distributed file storage system, said code causing said electronic device to:

store metadata associated with said private data objects on a first file storage system of said distributed file storage system;

store said private data objects on a second file storage system of said distributed file storage system but not said first file storage system, said second file storage system being located remotely from said first file storage system;

establish a connection between a user and said first file storage system;

use said metadata to facilitate the selection of one of said private data objects by a user, said user being located remotely from said first file storage system and said second file storage system; and enable said user to access said selected private data object; and wherein enabling said user to access said selected private data object includes providing said user with access information associated with said selected private data object;

said access information includes information enabling said user to establish a connection with said second file storage system;

said access information includes information enabling said user to access said selected private data object via said connection with said second file storage system;

said access information includes information enabling said user to send a request to generate a hyperlink to said second file storage system via said connection with said second file storage system; and said request to generate said hyperlink causes said second file storage system to generate said hyperlink and transmit said hyperlink to a second user, said second user being located remotely from said first file storage system and said second file storage system.

* * * * *